US012603082B2

(12) United States Patent
Yao et al.

(10) Patent No.: US 12,603,082 B2
(45) Date of Patent: Apr. 14, 2026

(54) METHOD FOR TRAINING VOICE CONVERSION MODEL, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Tianchu Yao, Shenzhen (CN); Xiaohui Sun, Shenzhen (CN); Baoxun Wang, Shenzhen (CN); Haolong Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 170 days.

(21) Appl. No.: 18/624,615

(22) Filed: Apr. 2, 2024

(65) Prior Publication Data

US 2024/0249712 A1      Jul. 25, 2024

Related U.S. Application Data

(63) Continuation of application No. PCT/CN2023/088026, filed on Apr. 13, 2023.

(30) Foreign Application Priority Data

Jun. 1, 2022      (CN) .......................... 202210614302.2

(51) Int. Cl.
G10L 13/00          (2006.01)
G10L 13/047          (2013.01)
(Continued)

(52) U.S. Cl.
CPC ............ G10L 13/047 (2013.01); G10L 15/02 (2013.01); G10L 21/007 (2013.01); *G10L 15/063* (2013.01); *G10L 15/16* (2013.01)

(58) Field of Classification Search
CPC ......... G10L 15/16; G10L 25/27; G10L 25/30; G10L 19/005; G10L 19/00; G10L 15/02;
(Continued)

(56) References Cited

U.S. PATENT DOCUMENTS

2019/0318722 A1    10/2019    Bromand
2021/0073671 A1     3/2021    Puri et al.
2023/0127787 A1     4/2023    Wang et al.

FOREIGN PATENT DOCUMENTS

CN          112037754 A        12/2020
CN          112365876 A         2/2021
(Continued)

OTHER PUBLICATIONS

The World Intellectual Property Organization (WIPO) International Search Report for PCT/CN2023/088026 Aug. 17, 2023 9 Pages (including translation).

*Primary Examiner* — Vu B Hang
(74) *Attorney, Agent, or Firm* — Anova Law Group, PLLC

(57) ABSTRACT

A method for training a voice conversion model includes acquiring a voice sample set that includes training voice samples corresponding to training object identifiers, a training voice sample corresponding to a piece of voice content, and at least one training voice sample being a synthesized voice sample; extracting voice features of the training voice samples to obtain initial voice features; fusing initial voice features that belong to different training object identifiers and have corresponding voice content matching each other to obtain target voice features; obtaining a voice feature set; and inputting a voice feature in the voice feature set into an initial voice conversion model to obtain predicted voice data, and adjusting a model parameter of the initial voice conversion model based on a difference between the pre-
(Continued)

dicted voice data and target voice data until a first convergence condition is met, to obtain a target voice conversion model.

20 Claims, 13 Drawing Sheets

(51) Int. Cl.
  *G10L 15/02*          (2006.01)
  *G10L 21/007*        (2013.01)
  *G10L 15/06*          (2013.01)
  *G10L 15/16*          (2006.01)

(58) Field of Classification Search
  CPC ....... G10L 15/063; G10L 15/12; G10L 15/22;
    G10L 15/07; G10L 15/20; G10L 25/78;
    G10L 25/87; G10L 15/26; G10L 15/30;
    G10L 15/065; G10L 21/0208; G10L
    2015/0631; G10L 15/187; G10L 15/08;
    G10L 17/02; G10L 17/04; G10L 17/06;
    G10L 15/06; G10L 13/02; G10L 13/033;
    G10L 21/007
  See application file for complete search history.

(56) References Cited

FOREIGN PATENT DOCUMENTS

| CN | 112509550 A | 3/2021 |
| CN | 114360557 A | 4/2022 |
| CN | 114566140 A | 5/2022 |

Figure 2:
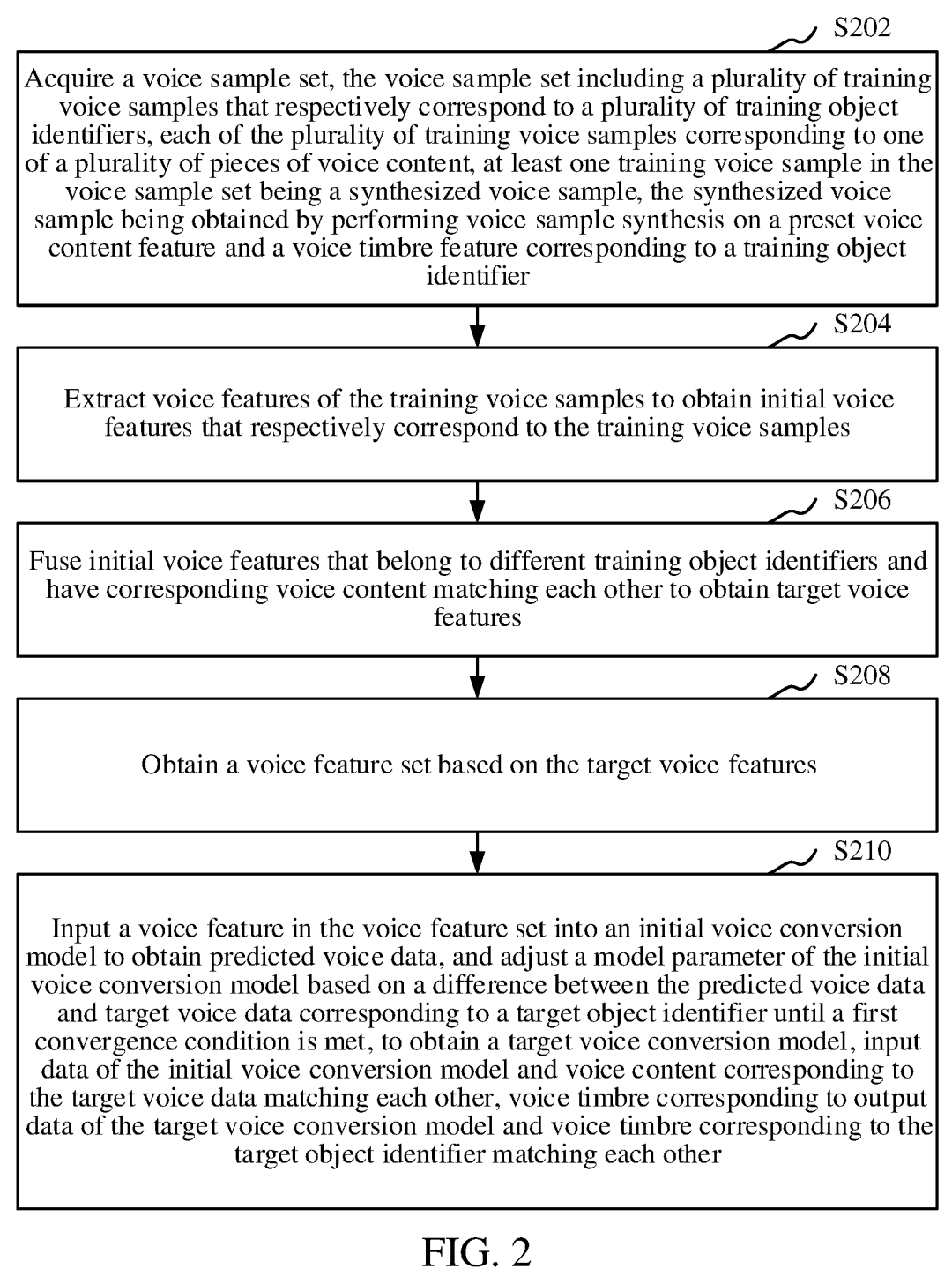

S202

Acquire a voice sample set, the voice sample set including a plurality of training voice samples that respectively correspond to a plurality of training object identifiers, each of the plurality of training voice samples corresponding to one of a plurality of pieces of voice content, at least one training voice sample in the voice sample set being a synthesized voice sample, the synthesized voice sample being obtained by performing voice sample synthesis on a preset voice content feature and a voice timbre feature corresponding to a training object identifier

S204

Extract voice features of the training voice samples to obtain initial voice features that respectively correspond to the training voice samples

S206

Fuse initial voice features that belong to different training object identifiers and have corresponding voice content matching each other to obtain target voice features

S208

Obtain a voice feature set based on the target voice features

S210

Input a voice feature in the voice feature set into an initial voice conversion model to obtain predicted voice data, and adjust a model parameter of the initial voice conversion model based on a difference between the predicted voice data and target voice data corresponding to a target object identifier until a first convergence condition is met, to obtain a target voice conversion model, input data of the initial voice conversion model and voice content corresponding to the target voice data matching each other, voice timbre corresponding to output data of the target voice conversion model and voice timbre corresponding to the target object identifier matching each other

Figure 5:
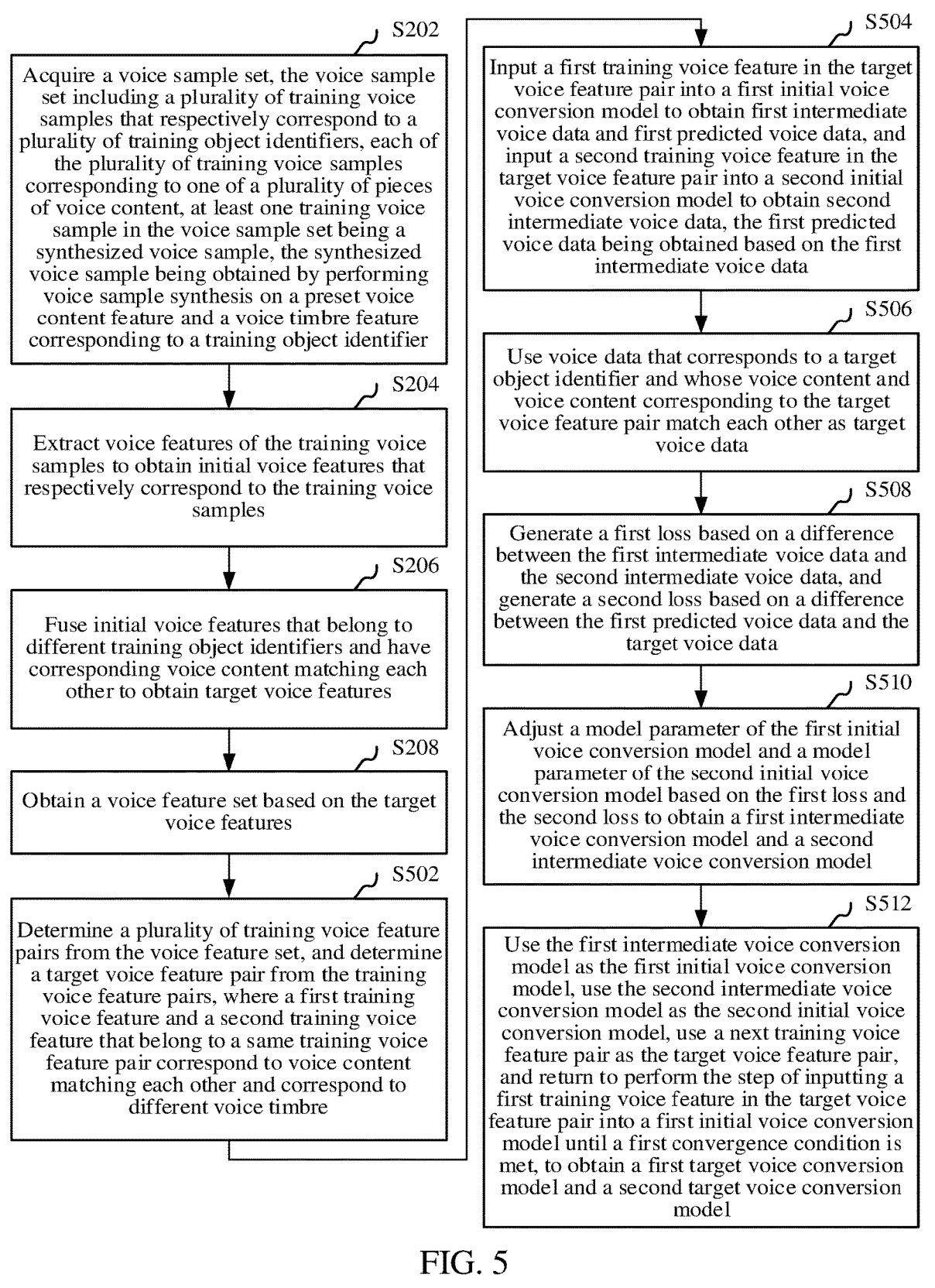

Acquire a voice sample set, the voice sample set including a plurality of training voice samples that respectively correspond to a plurality of training object identifiers, each of the plurality of training voice samples corresponding to one of a plurality of pieces of voice content, at least one training voice sample in the voice sample set being a synthesized voice sample, the synthesized voice sample being obtained by performing voice sample synthesis on a preset voice content feature and a voice timbre feature corresponding to a training object identifier

S204

Extract voice features of the training voice samples to obtain initial voice features that respectively correspond to the training voice samples

S206

Fuse initial voice features that belong to different training object identifiers and have corresponding voice content matching each other to obtain target voice features

S208

Obtain a voice feature set based on the target voice features

S502

Determine a plurality of training voice feature pairs from the voice feature set, and determine a target voice feature pair from the training voice feature pairs, where a first training voice feature and a second training voice feature that belong to a same training voice feature pair correspond to voice content matching each other and correspond to different voice timbre

S504

Input a first training voice feature in the target voice feature pair into a first initial voice conversion model to obtain first intermediate voice data and first predicted voice data, and input a second training voice feature in the target voice feature pair into a second initial voice conversion model to obtain second intermediate voice data, the first predicted voice data being obtained based on the first intermediate voice data

S506

Use voice data that corresponds to a target object identifier and whose voice content and voice content corresponding to the target voice feature pair match each other as target voice data

S508

Generate a first loss based on a difference between the first intermediate voice data and the second intermediate voice data, and generate a second loss based on a difference between the first predicted voice data and the target voice data

S510

Adjust a model parameter of the first initial voice conversion model and a model parameter of the second initial voice conversion model based on the first loss and the second loss to obtain a first intermediate voice conversion model and a second intermediate voice conversion model

S512

Use the first intermediate voice conversion model as the first initial voice conversion model, use the second intermediate voice conversion model as the second initial voice conversion model, use a next training voice feature pair as the target voice feature pair, and return to perform the step of inputting a first training voice feature in the target voice feature pair into a first initial voice conversion model until a first convergence condition is met, to obtain a first target voice conversion model and a second target voice conversion model

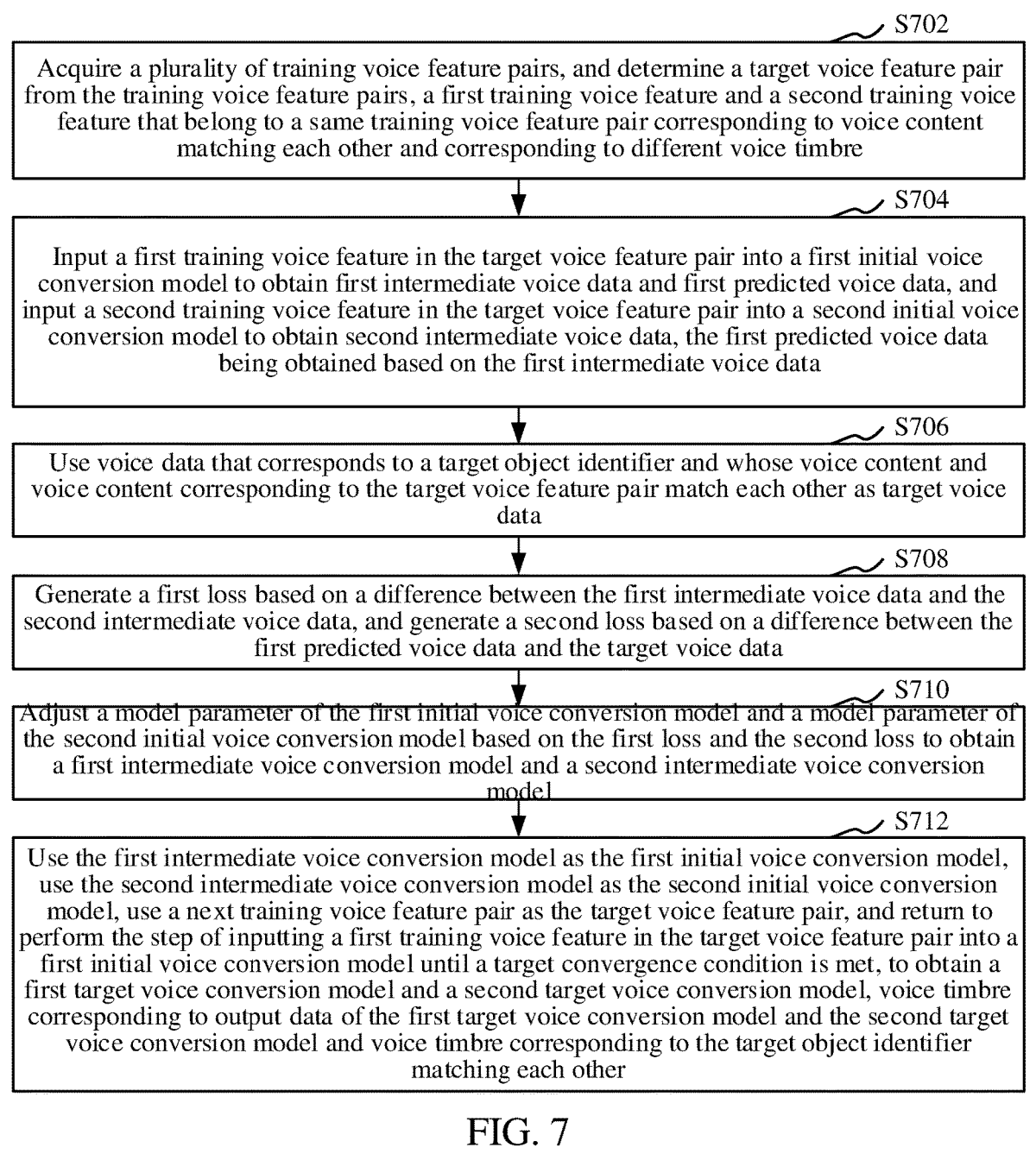

Acquire a plurality of training voice feature pairs, and determine a target voice feature pair from the training voice feature pairs, a first training voice feature and a second training voice feature that belong to a same training voice feature pair corresponding to voice content matching each other and corresponding to different voice timbre

S704

Input a first training voice feature in the target voice feature pair into a first initial voice conversion model to obtain first intermediate voice data and first predicted voice data, and input a second training voice feature in the target voice feature pair into a second initial voice conversion model to obtain second intermediate voice data, the first predicted voice data being obtained based on the first intermediate voice data

S706

Use voice data that corresponds to a target object identifier and whose voice content and voice content corresponding to the target voice feature pair match each other as target voice data

S708

Generate a first loss based on a difference between the first intermediate voice data and the second intermediate voice data, and generate a second loss based on a difference between the first predicted voice data and the target voice data

S710

Adjust a model parameter of the first initial voice conversion model and a model parameter of the second initial voice conversion model based on the first loss and the second loss to obtain a first intermediate voice conversion model and a second intermediate voice conversion model

S712

Use the first intermediate voice conversion model as the first initial voice conversion model, use the second intermediate voice conversion model as the second initial voice conversion model, use a next training voice feature pair as the target voice feature pair, and return to perform the step of inputting a first training voice feature in the target voice feature pair into a first initial voice conversion model until a target convergence condition is met, to obtain a first target voice conversion model and a second target voice conversion model, voice timbre corresponding to output data of the first target voice conversion model and the second target voice conversion model and voice timbre corresponding to the target object identifier matching each other

FIG. 7

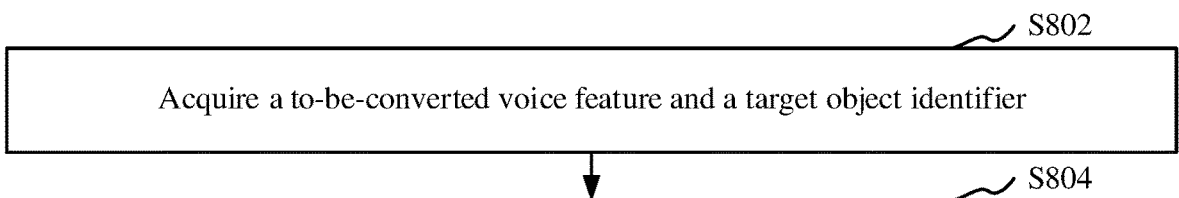

~ S802

Acquire a to-be-converted voice feature and a target object identifier

~ S804

Input the to-be-converted voice feature into a target voice conversion model corresponding to the target object identifier to obtain converted voice data, voice content corresponding to the converted voice data and voice content corresponding to the to-be-converted voice feature matching each other, voice timbre corresponding to the converted voice data and voice timbre corresponding to the target object identifier matching each other, the target voice conversion model being a first target voice conversion model or a second target voice conversion model

FIG. 8

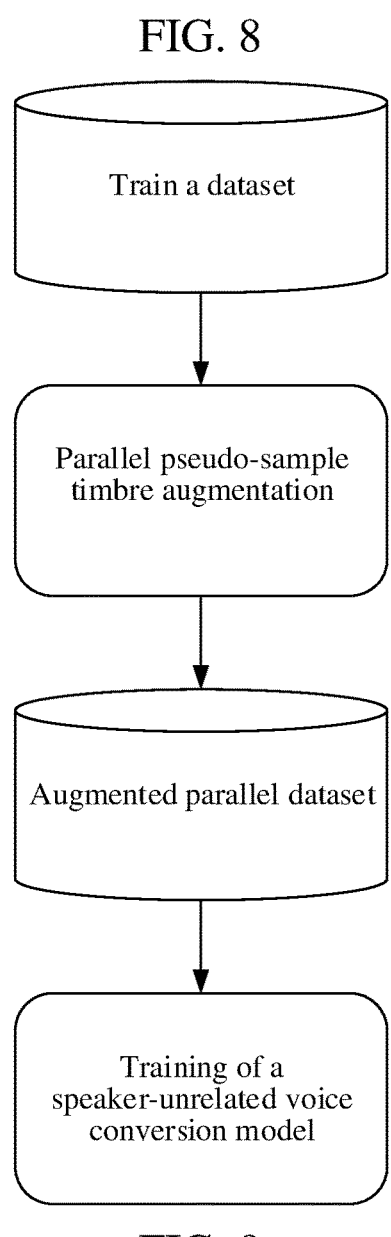

Train a dataset

Parallel pseudo-sample timbre augmentation

Augmented parallel dataset

Training of a speaker-unrelated voice conversion model

FIG. 9

METHOD FOR TRAINING VOICE CONVERSION MODEL, ELECTRONIC DEVICE, AND STORAGE MEDIUM

CROSS-REFERENCES TO RELATED APPLICATIONS

This application is a continuation application of PCT Patent Application No. PCT/CN2023/088026, filed on Apr. 13, 2023, which claims priority to Chinese Patent Application No. 202210614302.2, filed Administration on Jun. 1, 2022, all of which is incorporated by reference in their entirety.

FIELD OF THE TECHNOLOGY

The present disclosure relates to the field of voice processing technologies and, in particular, to a method and an apparatus for training a voice conversion model, a voice conversion method and apparatus, a computer device, a storage medium, and a computer program product.

BACKGROUND OF THE DISCLOSURE

With the development of voice technologies, voice conversion technologies have emerged. Voice conversion (VC) is to convert voice of an input speaker (a source speaker) into a voice with same content but timbre of a different speaker (a target speaker).

Often, real voices of a plurality of speakers are directly acquired, and training samples for a voice conversion model are generated based on the real voices to train the voice conversion model. However, recording costs of real voices are high with limited data acquired, and it is impossible for a model to learn conversion between different timbre, resulting in inaccurate voice conversion of the model.

SUMMARY

One embodiment of the present disclosure provides a method for training a voice conversion model, performed by a computer device. The method includes acquiring a voice sample set, the voice sample set including a plurality of training voice samples that respectively correspond to a plurality of training object identifiers, one of the plurality of training voice samples corresponding to one of a plurality of pieces of voice content, at least one training voice sample in the voice sample set being a synthesized voice sample, the synthesized voice sample being obtained by performing voice sample synthesis on a preset voice content feature and a voice timbre feature corresponding to a training object identifier; extracting voice features of the training voice samples to obtain initial voice features that respectively correspond to the training voice samples; fusing initial voice features that belong to different training object identifiers and have corresponding voice content matching each other to obtain target voice features; obtaining a voice feature set based on the target voice features; and inputting a voice feature in the voice feature set into an initial voice conversion model to obtain predicted voice data, and adjusting a model parameter of the initial voice conversion model based on a difference between the predicted voice data and target voice data corresponding to a target object identifier until a first convergence condition is met, to obtain a target voice conversion model, input data of the initial voice conversion model and voice content corresponding to the target voice data matching each other, voice timbre corresponding to output data of the target voice conversion model and voice timbre corresponding to the target object identifier matching each other.

Another embodiment of the present disclosure provides a computer device. The computer device includes a memory and one or more processors, the memory storing computer-readable instructions that, when being executed, causes the one or more processors to perform: acquiring a voice sample set, the voice sample set including a plurality of training voice samples that respectively correspond to a plurality of training object identifiers, one of the plurality of training voice samples corresponding to one of a plurality of pieces of voice content, at least one training voice sample in the voice sample set being a synthesized voice sample, the synthesized voice sample being obtained by performing voice sample synthesis on a preset voice content feature and a voice timbre feature corresponding to a training object identifier; extracting voice features of the training voice samples to obtain initial voice features that respectively correspond to the training voice samples; fusing initial voice features that belong to different training object identifiers and have corresponding voice content matching each other to obtain target voice features; obtaining a voice feature set based on the target voice features; and inputting a voice feature in the voice feature set into an initial voice conversion model to obtain predicted voice data, and adjusting a model parameter of the initial voice conversion model based on a difference between the predicted voice data and target voice data corresponding to a target object identifier until a first convergence condition is met, to obtain a target voice conversion model, input data of the initial voice conversion model and voice content corresponding to the target voice data matching each other, voice timbre corresponding to output data of the target voice conversion model and voice timbre corresponding to the target object identifier matching each other.

Another embodiment of the present disclosure provides a non-transitory computer-readable storage medium, storing computer-readable instructions that, when being executed, causes the one or more processors to perform: acquiring a voice sample set, the voice sample set including a plurality of training voice samples that respectively correspond to a plurality of training object identifiers, one of the plurality of training voice samples corresponding to one of a plurality of pieces of voice content, at least one training voice sample in the voice sample set being a synthesized voice sample, the synthesized voice sample being obtained by performing voice sample synthesis on a preset voice content feature and a voice timbre feature corresponding to a training object identifier; extracting voice features of the training voice samples to obtain initial voice features that respectively correspond to the training voice samples; fusing initial voice features that belong to different training object identifiers and have corresponding voice content matching each other to obtain target voice features; obtaining a voice feature set based on the target voice features; and inputting a voice feature in the voice feature set into an initial voice conversion model to obtain predicted voice data, and adjusting a model parameter of the initial voice conversion model based on a difference between the predicted voice data and target voice data corresponding to a target object identifier until a first convergence condition is met, to obtain a target voice conversion model, input data of the initial voice conversion model and voice content corresponding to the target voice data matching each other, voice timbre corresponding to output data of the target voice conversion model and voice timbre corresponding to the target object identifier matching each other.

Details of one or more embodiments of the present disclosure are provided in the following accompanying drawings and descriptions. Other features, objectives, and advantages of the present disclosure become clearer from the specification, the accompanying drawings, and the claims.

BRIEF DESCRIPTION OF THE DRAWINGS

To describe the technical solutions in the embodiments of the present disclosure more clearly, the accompanying drawings required for describing the embodiments are briefly described hereinafter. Apparently, the accompanying drawings in the following description show merely some embodiments of the present disclosure, and persons of ordinary skill in the art may obtain other accompanying drawings from these accompanying drawings without creative efforts.

FIG. 2 is a schematic flowchart of a method for training a voice conversion model according to an embodiment of the present disclosure;

FIG. 5 is a schematic flowchart of training a first initial voice conversion model and a second initial voice conversion model according to an embodiment of the present disclosure;

FIG. 7 is a schematic flowchart of a method for training a voice conversion model in another embodiment;

FIG. 8 is a schematic flowchart of a voice conversion method in another embodiment;

FIG. 9 is a schematic flowchart of establishing training samples of a voice conversion model and performing model training according to an embodiment of the present disclosure;

DESCRIPTION OF EMBODIMENTS

To make the objectives, technical solutions, and advantages of the present disclosure clearer and more comprehensible, the present disclosure is further elaborated in detail with reference to the accompanying drawings and embodiments. It is to be understood that the specific embodiments described herein are merely used for explaining the present disclosure but are not intended to limit the present disclosure.

Embodiments of the present disclosure may be applied to various scenarios, including, but not limited to, scenarios such as cloud technologies, artificial intelligence, intelligent transportation, and driver assistance. For example, the embodiments of the present disclosure may be applied to a driver assistance scenario, to perform voice conversion on a prompt voice in driver assistance.

Figure 1:
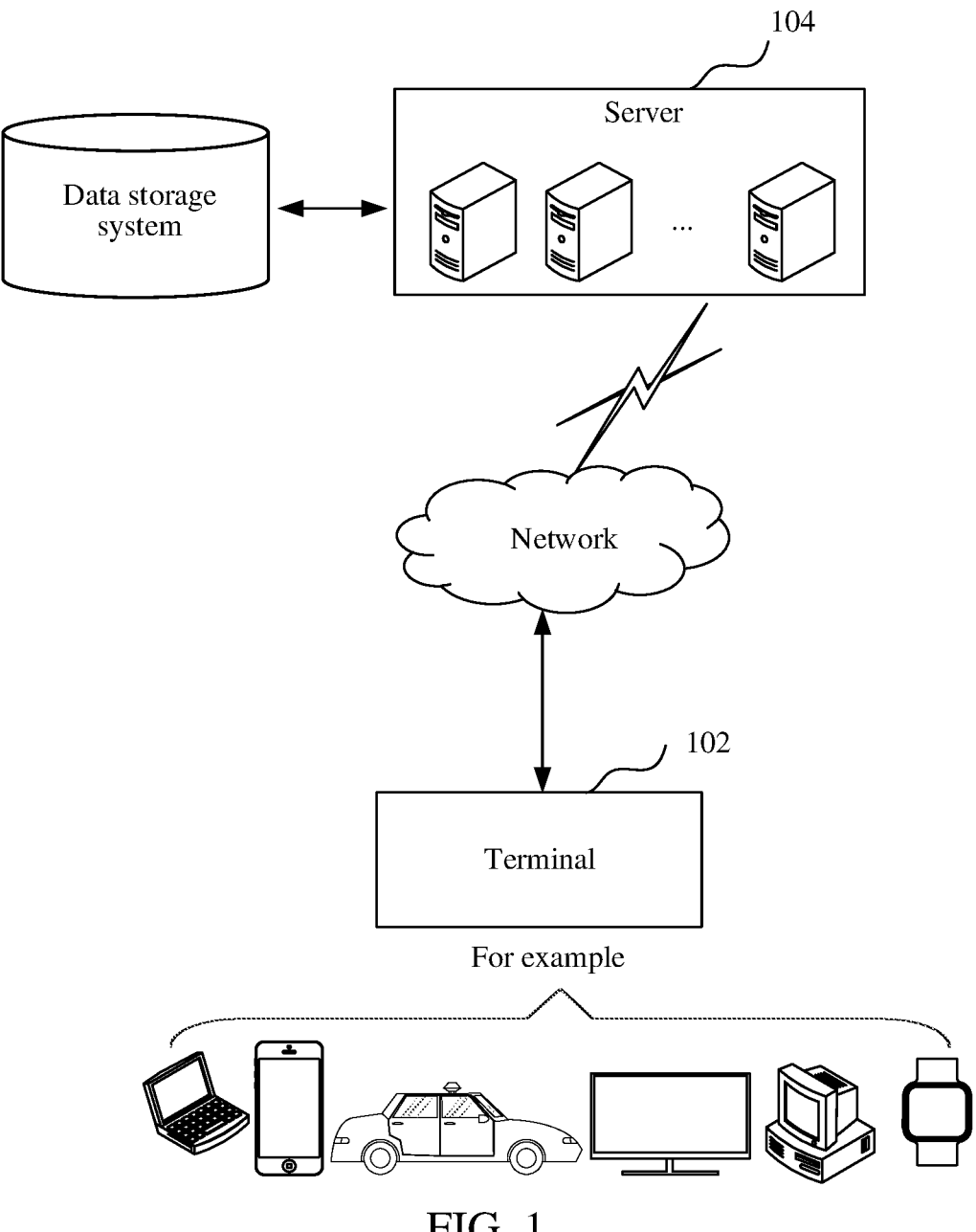
FIG. 1 is a diagram showing an application environment of a method for training a voice conversion model and a voice conversion method according to an embodiment of the present disclosure.

The solution provided in the embodiments of the present disclosure relates to artificial intelligence voice technologies, machine learning, and other technologies, and is described in detail through the following embodiments:

A method for training a voice conversion model and a voice conversion method provided in the embodiments of the present disclosure may be applied to an application environment shown in FIG. 1. A terminal 102 communicates with a server 104 by using a network. A data storage system may store data that needs to be processed by the server 104. The data storage system may be integrated in the server 104, or may be placed on a cloud or another server. The terminal 102 may be, but not limited to, any one of various desktop computers, notebook computers, smartphones, tablet computers, Internet of Things devices, and portable wearable devices. The Internet of Things devices may be a smart speaker, a smart TV, a smart air conditioner, a smart in-vehicle device, and the like. The portable wearable devices may be a smart watch, a smart waistband, a head-mounted device, and the like. There may be at least one terminal 102. The server 104 may be implemented by using an independent server or a server cluster that includes a plurality of servers or a cloud server.

The terminal and the server may be separately configured to perform the method for training a voice conversion model and the voice conversion method provided in the embodiments of the present disclosure.

For example, the server locally acquires a voice sample set. The voice sample set includes a plurality of training voice samples that respectively correspond to a plurality of training object identifiers, each of the plurality of training voice samples corresponds to one of a plurality of pieces of voice content, at least one training voice sample in the voice sample set is a synthesized voice sample, and the synthesized voice sample is obtained by performing voice sample synthesis on a preset voice content feature and a voice timbre feature corresponding to a training object identifier. The server extracts voice features of the training voice samples to obtain initial voice features that respectively correspond to the training voice samples, fuses initial voice features that belong to different training object identifiers and have corresponding voice content matching each other to obtain target voice features, and obtains a voice feature set based on the target voice features. The server inputs a voice feature in the voice feature set into an initial voice conversion model to obtain predicted voice data, and adjusts a model parameter of the initial voice conversion model based on a difference between the predicted voice data and target voice data corresponding to a target object identifier until a first convergence condition is met, to obtain a target voice conversion model, where input data of the initial voice conversion model and voice content corresponding to the target voice data match each other, and voice timbre corresponding to output data of the target voice conversion model and voice timbre corresponding to the target object identifier match each other.

The server acquires a to-be-converted voice feature and a target object identifier, and inputs the to-be-converted voice feature into a target voice conversion model corresponding to the target object identifier to obtain converted voice data, where voice content corresponding to the converted voice data and voice content corresponding to the to-be-converted voice feature match each other, and voice timbre corresponding to the converted voice data and voice timbre corresponding to the target object identifier match each other.

The server locally acquires a plurality of training voice feature pairs, and determines a target voice feature pair from the training voice feature pairs, where a first training voice feature and a second training voice feature that belong to a same training voice feature pair correspond to voice content matching each other and correspond to different voice timbre. The server inputs a first training voice feature in the target voice feature pair into a first initial voice conversion model to obtain first intermediate voice data and first predicted voice data, and inputs a second training voice feature in the target voice feature pair into a second initial voice conversion model to obtain second intermediate voice data, where the first predicted voice data is obtained based on the first intermediate voice data. The server uses voice data that corresponds to a target object identifier and whose voice content and voice content corresponding to the target voice feature pair match each other as target voice data. The server generates a first loss based on a difference between the first intermediate voice data and the second intermediate voice data, and generates a second loss based on a difference between the first predicted voice data and the target voice data, adjusts a model parameter of the first initial voice conversion model and a model parameter of the second initial voice conversion model based on the first loss and the second loss to obtain a first intermediate voice conversion model and a second intermediate voice conversion model, uses the first intermediate voice conversion model as the first initial voice conversion model, uses the second intermediate voice conversion model as the second initial voice conversion model, uses a next training voice feature pair as the target voice feature pair, and returns to perform the step of inputting a first training voice feature in the target voice feature pair into a first initial voice conversion model until a target convergence condition is met, to obtain a first target voice conversion model and a second target voice conversion model. Voice timbre corresponding to output data of the first target voice conversion model and the second target voice conversion model and voice timbre corresponding to the target object identifier matching each other.

The server acquires a to-be-converted voice feature and a target object identifier, and inputs the to-be-converted voice feature into a target voice conversion model corresponding to the target object identifier to obtain converted voice data. Voice content corresponding to the converted voice data and voice content corresponding to the to-be-converted voice feature match each other, voice timbre corresponding to the converted voice data and voice timbre corresponding to the target object identifier match each other, and the target voice conversion model is a first target voice conversion model or a second target voice conversion model.

The terminal and the server may be collaboratively configured to perform the method for training a voice conversion model and the voice conversion method provided in the embodiments of the present disclosure.

For example, the server acquires a voice sample set from the terminal. The server extracts voice features of the training voice samples to obtain initial voice features that respectively correspond to the training voice samples, fuses initial voice features that belong to different training object identifiers and have corresponding voice content matching each other to obtain target voice features, and obtains a voice feature set based on the target voice features. The server inputs a voice feature in the voice feature set into an initial voice conversion model to obtain predicted voice data, and adjusts a model parameter of the initial voice conversion model based on a difference between the predicted voice data and target voice data corresponding to a target object identifier until a first convergence condition is met, to obtain a target voice conversion model.

The server acquires a to-be-converted voice feature and a target object identifier from the server, and the server inputs the to-be-converted voice feature into a target voice conversion model corresponding to the target object identifier to obtain converted voice data. The server may send the converted voice data to the terminal, and the terminal plays the converted voice data.

The server acquires a plurality of training voice feature pairs from the terminal, inputs a first training voice feature in the target voice feature pair into a first initial voice conversion model to obtain first intermediate voice data and first predicted voice data, and inputs a second training voice feature in the target voice feature pair into a second initial voice conversion model to obtain second intermediate voice data. The server uses voice data that corresponds to a target object identifier and whose voice content and voice content corresponding to the target voice feature pair match each other as target voice data, generates a first loss based on a difference between the first intermediate voice data and the second intermediate voice data, and generates a second loss based on a difference between the first predicted voice data and the target voice data, adjusts a model parameter of the first initial voice conversion model and a model parameter of the second initial voice conversion model based on the first loss and the second loss to obtain a first intermediate voice conversion model and a second intermediate voice conversion model, uses the first intermediate voice conversion model as the first initial voice conversion model, uses the second intermediate voice conversion model as the second initial voice conversion model, uses a next training voice feature pair as the target voice feature pair, and returns to perform the step of inputting a first training voice feature in the target voice feature pair into a first initial voice conversion model until a target convergence condition is met, to obtain a first target voice conversion model and a second target voice conversion model.

The server acquires a to-be-converted voice feature and a target object identifier from the server, and the server inputs the to-be-converted voice feature into a target voice conversion model corresponding to the target object identifier to obtain converted voice data, where the target voice conversion model is a first target voice conversion model or a second target voice conversion model. The server may send the converted voice data to the terminal, and the terminal plays the converted voice data.

In the foregoing method for training a voice conversion model, initial voice features that belong to different training object identifiers and have corresponding voice content matching each other are fused to obtain target voice features, so that timbre augmentation can be implemented, to obtain a target voice feature whose voice content matches the initial voice features and has new timbre. In addition, the initial voice features include a voice feature extracted from a synthesized voice sample. The synthesized voice sample is a pseudo-sample. The pseudo-sample is not a real voice sample. The pseudo-sample helps to reduce collection pressure of voice samples, increase a data amount of voice samples, and increase a data amount of initial voice features, so that target voice features corresponding to various timbre can be obtained through timbre augmentation. A voice feature set formed by voice features corresponding to various timbre is used as a training set for a voice conversion model, so that training quality of the voice conversion model can be effectively improved. The model is enabled to learn conversion between different timbre, to reduce a risk of overfitting of specific timbre by the model, thereby effectively improving voice conversion accuracy of the voice conversion model.

In the foregoing voice conversion method, through a target voice conversion model, on the basis of keeping voice content corresponding to a current object identifier, voice timbre can be converted from timbre corresponding to the current object identifier into timbre corresponding to a target object identifier. A training set for the target voice conversion model is generated based on a synthesized voice sample and through timbre augmentation. The trained target voice conversion model has better voice conversion accuracy, so that more accurate voice conversion can be implemented by using the target voice conversion model, to obtain relatively accurate converted voice data. For the target voice conversion model, initial voice features that belong to different training object identifiers and have corresponding voice content matching each other are fused to obtain target voice features, so that timbre augmentation can be implemented, to obtain a target voice feature whose voice content matches the initial voice features and has new timbre. In addition, the initial voice features include a voice feature extracted from a synthesized voice sample. The synthesized voice sample is a pseudo-sample. The pseudo-sample is not a real voice sample. The pseudo-sample helps to reduce collection pressure of voice samples, increase a data amount of voice samples, and increase a data amount of initial voice features, so that target voice features corresponding to various timbre can be obtained through timbre augmentation. A voice feature set formed by voice features corresponding to various timbre is used as a training set for a voice conversion model, so that training quality of the voice conversion model can be effectively improved. The model is enabled to learn conversion between different timbre, to reduce a risk of overfitting of specific timbre by the model, thereby effectively improving voice conversion accuracy of the voice conversion model.

In the foregoing method for training a voice conversion model, through joint training between models, a first target voice conversion model and a second target voice conversion model with high voice conversion accuracy can be obtained through training. For a second loss adjustment model generated based on a difference between first predicted voice data and target voice data, output data of the model may be enabled to keep approaching an expected result, so that the trained model can convert input data into voice data with target timbre. For a first loss adjustment model generated based on a difference on first intermediate voice data and second intermediate voice data, the model may be enabled to make mapping positions of input data with matching content information and different timbre information to keep approaching in a feature space, so that the trained model can implement more stable voice conversion for input data with different timbre, thereby effectively improving voice conversion accuracy of the model. The first target voice conversion model and the second target voice conversion model that are obtained through model training based on a first loss and a second loss have high voice conversion accuracy.

In the foregoing voice conversion method, through a first target voice conversion model or a second target voice conversion model, on the basis of keeping voice content corresponding to a current object identifier, voice timbre can be converted from timbre corresponding to the current object identifier into timbre corresponding to a target object identifier. The first target voice conversion model and the second target voice conversion model are obtained through joint training and have high voice conversion accuracy, so that more accurate voice conversion can be implemented by using the first target voice conversion model or the second target voice conversion model, to obtain relatively accurate converted voice data. The first target voice conversion model and the second target voice conversion model are obtained through training based on a first loss and a second loss. For a second loss adjustment model generated based on a difference between first predicted voice data and target voice data, output data of the model may be enabled to keep approaching an expected result, so that the trained model can convert input data into voice data with target timbre. For a first loss adjustment model generated based on a difference on first intermediate voice data and second intermediate voice data, the model may be enabled to make mapping positions of input data with matching content information and different timbre information to keep approaching in a feature space, so that the trained model can implement more stable voice conversion for input data with different timbre, thereby effectively improving voice conversion accuracy of the model.

In an embodiment, as shown in FIG. 2, a method for training a voice conversion model is provided. An example in which the method is applied to a computer device is used for description. It may be understood that, the computer device may be the terminal 102 in FIG. 1, or may be the server 104. The method for training a voice conversion model includes the following steps:

Step S202: Acquire a voice sample set, the voice sample set including a plurality of training voice samples that respectively correspond to a plurality of training object identifiers, each of the plurality of training voice samples corresponding to one of a plurality of pieces of voice content, at least one training voice sample in the voice sample set being a synthesized voice sample, the synthesized voice sample being obtained by performing voice sample synthesis on a preset voice content feature and a voice timbre feature corresponding to a training object identifier.

The voice sample set is a set formed by a plurality of training voice samples. The training voice sample is a voice sample configured for generating input data during training of a voice conversion model. The voice sample is a sample formed by a voice. For example, a voice message sent in an application program may be used as the voice sample; audio in a video may be used as the voice sample; or the like.

The training object identifier is an object identifier corresponding to a training object. The object identifier is an identifier configured for uniquely identifying an object, and may be specifically a character string including at least one type of characters of letters, digits, and symbols. For example, the training object identifier may be a user account of a training user. The training voice sample corresponding to the training object identifier is a voice sample with voice timbre matching voice timbre corresponding to the training object identifier, that is, the training voice sample corresponding to the training object identifier is a voice sample with the voice timbre corresponding to the training object identifier.

The voice sample set includes a plurality of training voice samples that respectively correspond to a plurality of training object identifiers, and one training object identifier may correspond to at least one training voice sample. Each of the training voice samples has corresponding voice content. It may be understood that the training voice samples may correspond to same voice content. For example, the training voice samples are voices of different training objects for a same text. Alternatively, some of the training voice samples may correspond to same voice content. For example, in the voice sample set, training voice samples corresponding to training object identifiers A, B, C have same voice content. The training voice samples corresponding to the training object identifiers A, B, C have voice content 1. Training voice samples corresponding to training object identifiers D, E, F have same voice content. The training voice samples corresponding to the training object identifiers D, E, F have voice content 2.

The at least one training voice sample in the voice sample set is a synthesized the voice sample. That is, the training voice samples in the voice sample set may all be synthesized voice samples. Alternatively, some of the training voice samples may be synthesized voice samples, and some other of the training voice samples may be real voice samples. The real voice sample is a sample formed by a real voice. The synthesized voice sample is a pseudo-voice sample, and is a voice sample synthesized through a technical method rather than a real voice collected by a voice collection device. The synthesized voice sample is obtained by performing voice sample synthesis on a preset voice content feature and a voice timbre feature corresponding to a training object identifier. The preset voice content feature is a voice content feature that is set in advance. The preset voice content feature may be set according to an actual requirement. The preset voice content feature may be a randomly selected voice content feature, and is a voice content feature corresponding to any voice content. A voice content feature and a voice timbre feature are both features recognizable by a machine learning algorithm. The voice content feature is configured for representing voice content and content information of a voice. The voice content is configured for distinguishing voices of different semantics. A feature corresponding to voice content in a voice is extracted to obtain a voice content feature. The voice timbre feature is configured for representing voice timbre and timbre information of a voice. The voice timbre is configured for distinguishing voices of different objects. A feature corresponding to voice timbre in a voice is extracted to obtain a voice timbre feature. The voice sample synthesis is configured for synthesizing a voice content feature and a voice timbre feature to generate a voice sample. It may be understood that different synthesized voice samples may be obtained by synthesizing a same voice content feature and voice timbre features corresponding to different training object identifiers. Voice content corresponding to these synthesized voice samples matches each other, that is, these synthesized voice samples express a same semantic. The voice sample synthesis may be performed through a model, or the voice sample synthesis may be performed through a customized formula or algorithm.

It may be understood that one synthesized voice sample is obtained by performing voice sample synthesis on one preset voice content feature and a voice timbre feature corresponding to one training object identifier. In addition, the synthesized voice sample is obtained based on the preset voice content feature. In this case, voice content corresponding to the synthesized voice sample is voice content corresponding to the preset voice content feature. In the voice sample set, different synthesized voice samples may be obtained based on a same preset voice content feature, that is, different synthesized voice samples correspond to a same voice content. In the voice sample set, different synthesized voice samples may be respectively obtained based on different preset voice content features, that is, different synthesized voice samples correspond to different voice content.

In an embodiment, the voice content feature may be obtained by performing content feature extraction on a real voice. For example, the real voice may be inputted into a voice content feature extraction model, and the voice content feature extraction model outputs the voice content feature. Alternatively, the real voice may be inputted into a voice content recognition model, an intermediate processing result of voice content recognition model is acquired as the voice content feature, and the voice content recognition model is configured to convert a voice into a text. A real voice is inputted into the voice content recognition model, in the voice content recognition model, content feature extraction is performed on the real voice to obtain a voice content feature, content recognition is performed on the voice content feature, to obtain a voice content recognition result, and the voice content recognition model outputs the voice content recognition result. In an embodiment, the voice timbre feature corresponding to the training object identifier may be obtained by performing timbre feature extraction on a real voice corresponding to the training object identifier. For example, the real voice corresponding to the training object identifier may be inputted into a voice timbre feature extraction model, and the voice timbre feature extraction model outputs the voice timbre feature corresponding to the training object identifier. Alternatively, the real voice may be inputted into a voice object recognition model, an intermediate processing result of the voice object recognition model is acquired as the voice timbre feature, and the voice object recognition model is configured to recognize an object to which voice timbre belongs. The real voice corresponding to the training object identifier is inputted into the voice object recognition model, in the voice object recognition model, timbre feature extraction is performed on the real voice to obtain the voice timbre feature, timbre recognition is performed on the voice timbre feature to obtain a voice timbre recognition result, and the voice object recognition model outputs the voice timbre recognition result.

In an embodiment, the voice sample set includes at least one real voice sample. A voice content feature corresponding to one real voice sample may be acquired as a preset voice content feature configured for generating one synthesized voice sample. The voice content feature corresponding to the real voice sample is obtained by performing content feature extraction on the real voice.

Specifically, the computer device may acquire a voice sample set locally or on another device, generate a training set for a voice conversion model based on the voice sample set, and perform model training on a to-be-trained voice conversion model based on the training set to obtain a trained voice conversion model.

In an embodiment, the training voice samples in the voice sample set are all synthesized voice samples, and voice content corresponding to the synthesized voice sample s in the voice sample set match each other, that is, the voice sample set is a parallel data set.

In an embodiment, the voice sample set may include at least one group of training voice samples with matching voice content. The matching voice content is that a same semantic is expressed. The matching voice content may be that voice content is completely consistent. If voice content is completely consistent, a same semantic is obviously expressed. The matching voice content may be that voice content is not completely consistent but a same semantic is expressed. For example, voice samples with a content similarity degree greater than a preset similarity degree may be determined as voice samples with matching voice content. One group of training voice samples with matching voice content may include at least one type of synthesized voice samples and real voice samples. One group of training voice samples with matching voice content may include training voice samples corresponding to at least two training object identifiers. If the voice sample set includes at least two groups of training voice samples with matching voice content, it indicates that the voice sample set is a non-parallel data set.

Step S204: Extract voice features of the training voice samples to obtain initial voice features that respectively correspond to the training voice samples.

A feature corresponding to a voice is extracted to obtain a voice feature. The voice feature may be configured for representing voice content and voice timbre, that is, the voice feature is fused with a voice content feature and a voice timbre feature. The initial voice feature is a voice feature extracted from the training voice sample.

Specifically, after acquiring the voice sample set, the computer device may perform feature extraction on the voice sample set to obtain the initial voice features that respectively correspond to the training voice samples.

In an embodiment, the computer device may input a training voice sample into a voice feature extraction model to obtain an initial voice feature corresponding to the training voice sample. It may be understood that, the training voice sample has corresponding voice content, and the initial voice feature corresponding to the training voice sample obviously also has corresponding voice content.

Step S206: Fuse initial voice features that belong to different training object identifiers and have corresponding voice content matching each other to obtain target voice features.

The target voice feature is a voice feature obtained by fusing initial voice features.

Specifically, because training object identifiers are limited, voice timbre corresponding to initial voice features is limited. To generate voice features with more timbre, the computer device may acquire initial voice features that belong to different object identifiers but have matching voice content from the initial voice features, and fuse the initial voice features that belong to different training object identifiers and have corresponding voice content matching each other to obtain target voice features. Because initial voice features with voice content matching each other are fused to obtain target voice features, voice content of the target voice features obtained through fusion and voice content of the initial voice features configured for fusion also match each other. Because initial voice features that belong to different training object identifiers are fused to obtain target voice features, voice timbre of the target voice features obtained through fusion and voice timbre of the initial voice features configured for fusion are different.

It may be understood that the initial voice features that belong to different training object identifiers and have corresponding voice content matching each other are voice features of at least two training voice samples that belong to different training object identifiers and have corresponding voice content matching each other. The matching voice content may be that voice content is completely consistent, or may be that voice content is not completely consistent but a same semantic is expressed. For example, voice features with a content similarity degree greater than a preset similarity degree may be determined as voice features with matching voice content, that is, voice samples with a content similarity degree greater than a preset similarity degree may be determined as voice samples with matching voice content, and voice content that naturally corresponds voice features corresponding to the voice samples with matching voice content also match each other. A content similarity degree between two voice samples may be calculated based on a difference between voice content features that respectively correspond to the two voice samples. For example, the content similarity degree between the two voice samples may be obtained by calculating a cosine similarity degree between the voice content features that respectively correspond to the two voice samples, and when the cosine similarity degree is higher, the content similarity degree is higher; or the content similarity degree between the two voice samples may be obtained by calculating a Euclidean distance between the voice content features that respectively correspond to the two voice samples, and when the Euclidean distance is smaller, the content similarity degree is higher. The preset similarity degree is a similarity degree threshold, and a specific value of the preset similarity degree may be set according to an actual requirement. For example, a value interval of the similarity degree is [0, 1], and in this case, 0.9 may be used as the preset similarity degree.

It may be understood that, the computer device may obtain a plurality of target voice features through a plurality of times of fusion. In each time of fusion, at least two initial voice features may be fused to obtain one target voice feature. In each time of fusion, at least two initial voice features that belong to different training object identifiers and have corresponding voice content matching each other are fused to obtain one target voice feature. For example, the voice sample set includes a training voice sample a corresponding to a training object identifier A, a training voice sample b corresponding to a training object identifier B, a training voice sample c corresponding to a training object identifier C, and training voice sample d corresponding to a training object identifier D. Voice content corresponding to the training voice samples in the voice sample sets is consistent, and initial voice features that respectively correspond to any two training voice samples in the voice sample set may be fused. The initial voice features that respectively correspond to the training voice sample a and the training voice sample b are fused to obtain a target voice feature e1, the initial voice features that respectively correspond to the training voice sample a and the training voice sample c are fused to obtain a target voice feature e2, the initial voice features that respectively correspond to the training voice sample a and the training voice sample d are fused to obtain a target voice feature e3, the initial voice features that respectively correspond to the training voice sample b and the training voice sample c are fused to obtain a target voice feature e4, the initial voice features that respectively correspond to the training voice sample b and the training voice sample d are fused to obtain a target voice feature e5, and the initial voice features that respectively correspond to the training voice sample c and the training voice sample d are fused to obtain a target voice feature e6. Certainly, initial voice features that respectively correspond to any three or even more training voice samples in the voice sample set may be fused to obtain a plurality of target voice features.

In an embodiment, the training voice samples in the voice sample set are synthesized voice samples, the synthesized voice samples may be obtained by performing voice sample synthesis on a same voice content feature and different voice timbre features, and therefore voice content corresponding to the synthesized voice samples match each other. Further, during fusion of initial voice features, initial voice features corresponding to different synthesized voice samples may be randomly acquired for fusion, and a plurality of target voice features are quickly obtained through a plurality of times of fusion.

Step S208: Obtain a voice feature set based on the target voice features.

The voice feature set is a set formed by a plurality of voice features.

Specifically, after obtaining the target voice features through fusion, the computer device may use the target voice features to form a voice feature set. The voice feature set is used as a training set for a to-be-trained voice conversion model.

In an embodiment, the computer device may obtain the voice feature set based on the initial voice features and the target voice features. In this way, the voice feature set formed by the initial voice features and the target voice features may include data with more timbre, which helps to improve training quality of a subsequent model, to enable the model to learn conversion between more timbre, thereby further reducing a risk of overfitting of specific timbre by the model.

In an embodiment, the voice feature set may include at least one group of voice features with matching voice content.

Step S210: Input a voice feature in the voice feature set into an initial voice conversion model to obtain predicted voice data, and adjust a model parameter of the initial voice conversion model based on a difference between the predicted voice data and target voice data corresponding to a target object identifier until a first convergence condition is met, to obtain a target voice conversion model, input data of the initial voice conversion model and voice content corresponding to the target voice data matching each other, voice timbre corresponding to output data of the target voice conversion model and voice timbre corresponding to the target object identifier matching each other.

The voice conversion model is a machine learning model, and is configured to convert voice timbre corresponding to input data. The input data of the voice conversion model is a voice feature, and output data is voice data. The output data may be directly a voice, or may be spectral data of a voice, and the spectral data is subsequently converted into a voice. The initial voice conversion model is a to-be-trained voice conversion model. The target voice conversion model is a trained voice conversion model.

The predicted voice data is output data and predicted data of the initial voice conversion model. The target voice data is voice data with voice timbre corresponding to a target object identifier. Voice content corresponding to the input data of the initial voice conversion model and the target voice data match each other. If the voice data is directly a voice, a voice that corresponds to a target object identifier and has a voice feature and a model input feature matching each other in voice content may be acquired as target voice data. For example, if voice content corresponding to the training voice samples in the voice sample set is "Good morning", voice content corresponding to a target voice feature obtained based on the voice sample set is also "Good morning". If a target object identifier is an object identifier corresponding to a cartoon character A, a voice of speaking "Good morning" by the cartoon character A may be acquired as target voice data. If the voice data is spectral data of a voice, a voice that corresponds to a target object identifier and has a voice feature and a model input feature matching each other in voice content may be acquired as a target voice, and spectral data of the target voice is extracted as target voice data. The target voice data corresponding to the target object identifier is expected output data of the voice conversion model, and the objective of model training is to enable the predicted voice data and the target voice data to keep approaching, so that the trained target voice conversion model may convert input data with any timbre into voice data with target timbre without changing a semantic corresponding to the input data.

In an embodiment, the target voice feature is obtained by fusing initial voice features that belong to different training object identifiers and have corresponding voice content matching each other, and the initial voice features are obtained by extracting voice features of training voice samples. In this case, a voice content feature corresponding to any training voice sample corresponding to the target voice feature may be used as a voice content feature corresponding to the target voice feature. For example, voice content corresponding to the training voice sample a of the training object identifier A and voice content corresponding to the training voice sample b of the training object identifier B are consistent, the initial voice features that respectively correspond to the training voice samples a and b are fused to obtain a target voice feature, and the voice content feature corresponding to the target voice feature may be a voice content feature corresponding to the training voice sample a, or may be a voice content feature corresponding to the training voice sample b. During acquisition of the target voice data, a voice with a voice content feature matching a voice content feature corresponding to a model input feature may be acquired from a plurality of voices corresponding to a target object identifier as the target voice data. If a content similarity degree calculated based on a difference between two voice content features is greater than a preset similarity degree, the two voice content features match each other.

The target object identifier is an object identifier corresponding to a target object. The target object may be any one of the training objects or may be an object other than the training objects. In an embodiment, the target object may be a virtual role. For example, the target object may be a cartoon role, a game role, or the like.

Specifically, the computer device may input the voice feature in the voice feature set into the initial voice conversion model to obtain predicted voice data, and the computer device calculates loss information based on a difference between the predicted voice data and the target object identifier, for example, calculates any data such as a difference value, a mean square error, or a root mean square error that indicates a difference or an error between the predicted voice data and the target object identifier as the loss information. The computer device performs back propagation based on the loss information to adjust the model parameter of the initial voice conversion model until the first convergence condition is met, to obtain the target voice conversion model.

The first convergence condition is a condition configured for determining whether the voice conversion model has been trained to convergence. The first convergence condition may be at least one of conditions such as that the loss information is less than a first loss threshold, a quantity of model iterations is greater than a first preset quantity of times, and a model parameter change value between two model iterations is less than a first change threshold. The first loss threshold and the first change threshold are set in advance, and may be specifically set according to an actual requirement. The model parameter change value between two model iterations may be a difference value between model parameters of models that are obtained in two model iterations, or may be a change proportion between model parameters of models obtained in two model iterations. For example, the change proportion is the difference value between the model parameters of models obtained in two model iterations to the larger value of the model parameters of models obtained in two model iterations, or the change proportion is the difference value between the model parameters of models obtained in two model iterations to the smaller value of the model parameters of models obtained in two model iterations.

In an embodiment, a reference voice feature is determined from the voice feature set, the reference voice feature is inputted into the initial voice conversion model to obtain predicted voice data, voice data that corresponds to the target object identifier and whose voice content matches voice content corresponding to the reference voice feature is acquired as target voice data, the model parameter of the initial voice conversion model is adjusted based on a difference between the predicted voice data and the target voice data to obtain an intermediate voice conversion model, the intermediate voice conversion model is used as an initial voice conversion model, and the step of determining a reference voice feature from the voice feature set is performed again until the first convergence condition is met, to obtain the target voice conversion model.

Specifically, the computer device may randomly determine a reference voice feature from the voice feature set, input the reference voice feature into the initial voice conversion model to obtain predicted voice data, acquire voice data that corresponds to the target object identifier and whose voice content matches voice content corresponding to the reference voice feature as target voice data, adjust the model parameter of the initial voice conversion model based on a difference between the predicted voice data and the target voice data to obtain an intermediate voice conversion model, redetermine a new reference voice feature from the voice feature set, use the intermediate voice conversion model as a new initial voice conversion model, and return to perform the step of inputting the reference voice feature into the initial voice conversion model to obtain predicted voice data to iteratively train the model to continuously adjust the model parameter until the first convergence condition is met, to obtain the target voice conversion model. For example, if loss information calculated based on the difference between the predicted voice data and the target voice data in a round of training is less than the first loss threshold, the adjustment of the model parameter is stopped, and a voice conversion model obtained through the latest adjustment is used as the target voice conversion model. If a quantity of model iterations after a round of training is greater than a preset quantity of times, the voice conversion model obtained through the latest adjustment is used as the target voice conversion model. The reference voice feature determined in each round of training may include at least one voice feature in the voice feature set.

It may be understood that one model iteration or one round of model training indicates performing once the steps of "determining a reference voice feature from the voice feature set, inputting the reference voice feature into the initial voice conversion model to obtain predicted voice data, acquiring voice data that corresponds to the target object identifier and whose voice content matches voice content corresponding to the reference voice feature as target voice data, and adjusting the model parameter of the initial voice conversion model based on a difference between the predicted voice data and the target voice data to obtain an intermediate voice conversion model".

If the reference voice feature determined in each round of training includes at least two voice features, in this case, one voice feature is used as one reference voice feature. One reference voice feature is inputted into the initial voice conversion model to obtain one piece of predicted voice data. In a round of training, the reference voice features are respectively inputted into the initial voice conversion model to obtain the predicted voice data. For any piece of predicted voice data, voice data that corresponds to the target object identifier and whose voice content matches voice content corresponding to the predicted voice data is acquired as the target voice data. In this case, one piece of predicted voice data has one corresponding piece of target voice data. Sub-loss information is calculated based on the difference between the predicted voice data and the target voice data that correspond to each other. At least two pieces of sub-loss information are obtained. The at least two pieces of sub-loss information are fused to obtain loss information. Finally, back propagation is performed based on the loss information to adjust the model parameter of the initial voice conversion model to obtain an intermediate voice conversion model. The fusing the sub-loss information may be specifically adding the sub-loss information or may be calculating an average value of the sub-loss information.

In an embodiment, there may be at least one initial voice conversion model, and different initial voice conversion models may be respectively trained based on the voice feature set to obtain a plurality of target voice conversion models. Different initial voice conversion models correspond to different target object identifiers, and different target object identifiers correspond to different voice timbre. In an embodiment, the computer device may generate loss information based on a loss function. The loss function may be a common loss function in model training or may be a customized loss function. In an embodiment, the model parameter may be adjusted based on the loss information through a gradient descent algorithm.

In the foregoing method for training a voice conversion model, initial voice features that belong to different training object identifiers and have corresponding voice content matching each other are fused to obtain target voice features, so that timbre augmentation can be implemented, to obtain a target voice feature whose voice content matches the initial voice features and has new timbre. In addition, the initial voice features include a voice feature extracted from a synthesized voice sample. The synthesized voice sample is a pseudo-sample. The pseudo-sample is not a real voice sample. The pseudo-sample helps to reduce collection pressure of voice samples, increase a data amount of voice samples, and increase a data amount of initial voice features, so that target voice features corresponding to various timbre can be obtained through timbre augmentation. A voice feature set formed by voice features corresponding to various timbre is used as a training set for a voice conversion model, so that training quality of the voice conversion model can be effectively improved. The model is enabled to learn conversion between different timbre, to reduce a risk of overfitting of specific timbre by the model, thereby effectively improving voice conversion accuracy of the voice conversion model.

In an embodiment, the synthesized voice sample is obtained by inputting a preset voice content feature and a voice timbre feature corresponding to a training object identifier into a target voice sample synthesis model. A training process of the target voice sample synthesis model includes the following steps:

acquiring original voice samples and voice timbre features corresponding to a plurality of candidate object identifiers, and determining a reference object identifier from the plurality of candidate object identifiers; acquiring a voice content feature matching voice content of an original voice sample corresponding to the reference object identifier as a reference voice content feature; inputting a voice timbre feature and the reference voice content feature that correspond to the reference object identifier into an initial voice sample synthesis model to obtain a predicted voice sample corresponding to the reference object identifier; adjusting a model parameter of the initial voice sample synthesis model based on the original voice sample and the predicted voice sample that correspond to the reference object identifier to obtain an intermediate voice sample synthesis model; and using a next candidate object identifier as the reference object identifier, using the intermediate voice sample synthesis model as the initial voice sample synthesis model, and returning to perform the step of acquiring a voice content feature matching voice content of an original voice sample corresponding to the reference object identifier as a reference voice content feature until a second convergence condition is met, to obtain the target voice sample synthesis model.

The target voice sample synthesis model is a trained voice sample synthesis model. The initial voice sample synthesis model is a to-be-trained voice sample synthesis model. Input data of the voice sample synthesis model is a voice content feature and a voice timbre feature, and output data of the voice sample synthesis model is a synthesized voice sample.

The original voice sample corresponding to the candidate object identifier is a real voice sample corresponding to the candidate object identifier. The candidate object identifier is an object identifier corresponding to a candidate object. The candidate object may be a training object or may be an object other than the training object. The predicted voice sample is output data and predicted data of the initial voice sample synthesis model.

Specifically, the computer device may perform voice sample synthesis through the target voice sample synthesis model. The computer device may input any voice content feature and the voice timbre feature corresponding to the training object identifier into the target voice sample synthesis model, and the target voice sample synthesis model outputs a synthesized voice sample with voice content and voice timbre corresponding to input data.

During the training of the voice sample synthesis model, the computer device may acquire a voice content feature matching voice content of the original voice sample corresponding to the candidate object identifier, acquire a voice timbre feature corresponding to the candidate object identifier, and perform model training on the initial voice sample synthesis model based on the acquired voice content feature and voice timbre feature and the original voice sample corresponding to the candidate object identifier to obtain the target voice sample synthesis model. The voice content feature and the voice timbre feature are used as the input data of the voice sample synthesis model, the original voice sample is used as expected output data of the voice sample synthesis model, and a training objective of the model is to enable actual output data and expected output data of the model to be as close as possible, so that the model can output a pseudo-voice sample close to a real voice sample, to achieve the effect of a real voice.

The computer device may acquire original voice samples and voice timbre features corresponding to a plurality of candidate object identifiers, and for any candidate object identifier, acquire an original voice sample and a voice timbre feature corresponding to the candidate object identifier. The computer device randomly selects an object identifier from the plurality of candidate object identifiers as a reference object identifier. Further, the computer device acquires a voice content feature matching voice content of an original voice sample corresponding to the reference object identifier as a reference voice content feature, where the reference voice content feature is used as input data of the model. The computer device inputs a voice timbre feature and the reference voice content feature that correspond to the reference object identifier into an initial voice sample synthesis model, and through data processing of the model, the model outputs a predicted voice sample corresponding to the reference object identifier. Further, the computer device calculates loss information based on a difference between the predicted voice sample and the original voice sample that correspond to the reference object identifier, for example, calculates any data such as a difference value, a mean square error, or a root mean square error that indicates a difference or an error between the predicted voice sample and the original voice sample that correspond to the reference object identifier as loss information, performs back propagation based on the loss information, and adjusts the model parameter of the initial voice sample synthesis model, to obtain the intermediate voice sample synthesis model. The computer device acquires a next candidate object identifier as a new reference object identifier, uses the intermediate voice sample synthesis model as a new initial voice sample synthesis model, and returns to perform the step of acquiring a voice content feature matching voice content of an original voice sample corresponding to the reference object identifier as a reference voice content feature to iteratively train the model to continuously adjust the model parameter through a plurality of iterations of the model until a second convergence condition is met, to obtain the target voice sample synthesis model.

The second convergence condition is a condition configured for determining whether the voice sample synthesis model has been trained to convergence. The second convergence condition may be at least one of conditions such as that the loss information is less than a second loss threshold, a quantity of model iterations is greater than a second preset quantity of times, and a model parameter change value between two model iterations is less than a second change threshold. The second loss threshold and the second change threshold are set in advance, and may be specifically set according to an actual requirement.

It may be understood that, an original voice sample and a reference voice content feature that correspond to a same reference object identifier correspond to voice content matching each other, and voice content features of original voice samples corresponding to different reference object identifiers may be the same or may be different. In addition, a reference object identifier determined each time may include at least one candidate object identifier.

In an embodiment, voice content of original voice samples corresponding to different candidate object identifiers may be different, that is, an original sample set formed by original voice samples corresponding to the candidate object identifiers may be a non-parallel data set. In this way, the voice sample synthesis model is trained based on the non-parallel data set, a parallel data set may be generated based on the trained voice sample synthesis model, and the parallel data set includes a plurality of synthesized voice samples with matching voice content. Compared with collection of real voice samples to form a parallel data set, a parallel data set may be quickly generated based on the voice sample synthesis model.

In an embodiment, the reference voice content feature and the preset voice content feature may be the same.

In the foregoing embodiment, the synthesized voice sample is obtained by inputting a preset voice content feature and a voice timbre feature corresponding to a training object identifier into a target voice sample synthesis model, and the synthesized voice sample may be quickly generated by using the target voice sample synthesis model. A training process of the target voice sample synthesis model includes the following steps: acquiring original voice samples and voice timbre features corresponding to a plurality of candidate object identifiers, and determining a reference object identifier from the plurality of candidate object identifiers; acquiring a voice content feature matching voice content of an original voice sample corresponding to the reference object identifier as a reference voice content feature; inputting a voice timbre feature and the reference voice content feature that correspond to the reference object identifier into an initial voice sample synthesis model to obtain a predicted voice sample corresponding to the reference object identifier; adjusting a model parameter of the initial voice sample synthesis model based on the original voice sample and the predicted voice sample that correspond to the reference object identifier to obtain an intermediate voice sample synthesis model; and using a next candidate object identifier as the reference object identifier, using the intermediate voice sample synthesis model as the initial voice sample synthesis model, and returning to perform the step of acquiring a voice content feature matching voice content of an original voice sample corresponding to the reference object identifier as a reference voice content feature until a second convergence condition is met, to obtain the target voice sample synthesis model. In this way, supervised training may be performed on the initial voice sample synthesis model based on the reference voice content feature and the original voice sample and the voice timbre feature that correspond to the reference object identifier, to quick obtain the target voice sample synthesis model.

Figure 3:
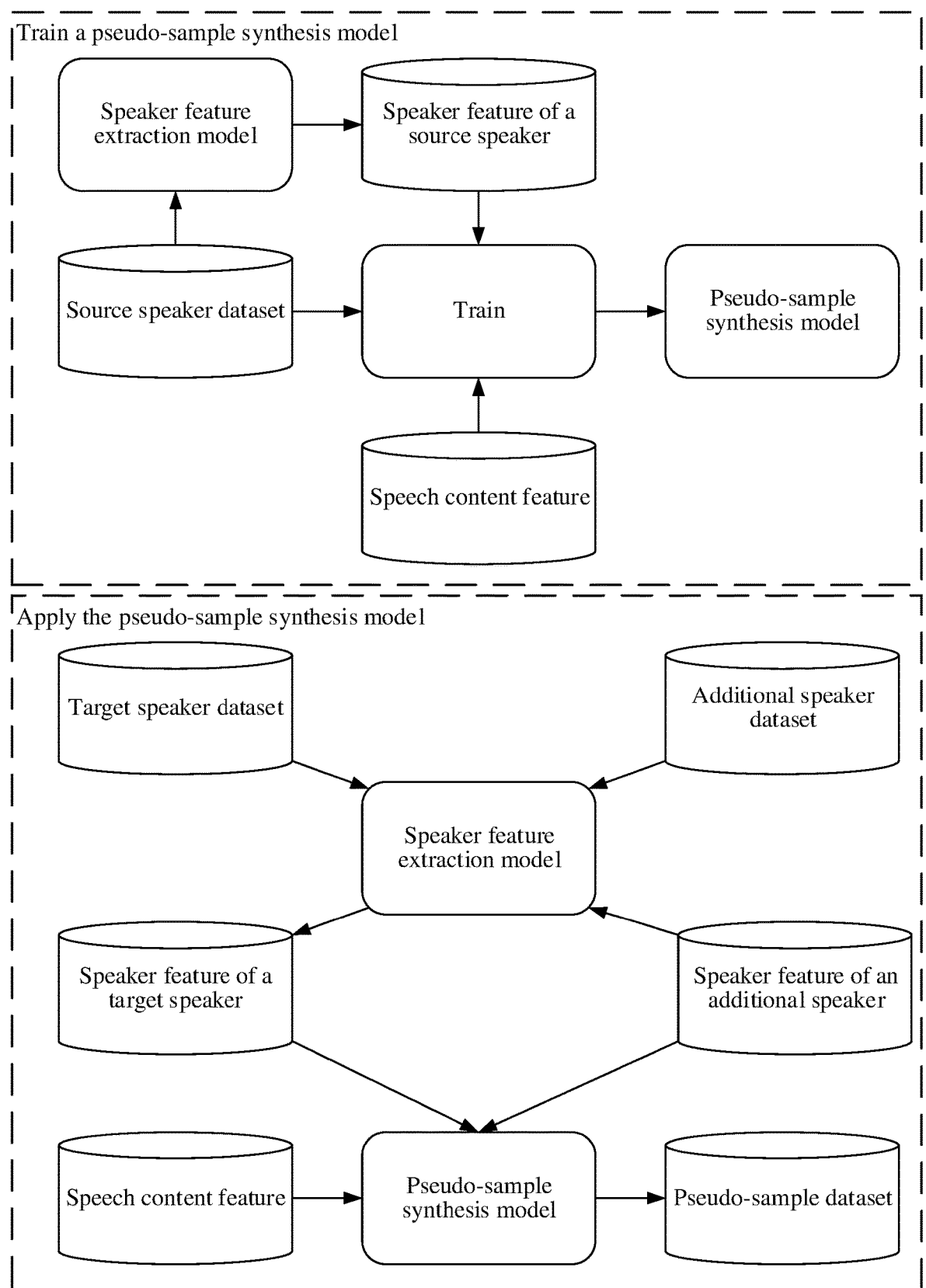
FIG. 3 is a schematic diagram of training and applying a pseudo-sample synthesis model according to an embodiment of the present disclosure.

In a specific embodiment, FIG. 3 shows a training process and an application process of a pseudo-sample synthesis model. The pseudo-sample synthesis model may also be referred to as a voice sample synthesis model. A source speaker data set includes voices of a plurality of source speakers, and is configured for training the pseudo-sample synthesis model. The source speaker data set may not include a voice of a target speaker. A target speaker data set includes the voice of the target speaker, and is configured for generating a pseudo-sample data set. An additional speaker data set includes voices of a number of speakers other than the target speaker, and configured for augmenting the pseudo-sample data set. During voice conversion, an input voice is from a source speaker, and an expected output voice has same timbre as the target speaker.

In a training phase of the pseudo-sample synthesis model, a voice in the source speaker data set is inputted into a speaker feature extraction model to obtain a speaker feature of the source speaker (which may also be referred to as a speaker timbre feature), and a to-be-trained pseudo-sample synthesis model is trained based on the speaker feature and a speech content feature of the source speaker to obtain a trained pseudo-sample synthesis model. A plurality of source speakers may be divided into a plurality of groups of source speakers. Speaker features and speech content features of any group of source speakers are inputted into the to-be-trained pseudo-sample synthesis model to obtain predicted voices corresponding to source speakers in the current group. The pseudo-sample synthesis model is adjusted based on the predicted voices and real voices that correspond to the source speakers in the current group to obtain a new pseudo-sample synthesis model. Speaker features and speech content features of a next group of source speakers are inputted into the new pseudo-sample synthesis model to perform iterative training until a convergence condition is met, to obtain a trained pseudo-sample synthesis model.

In an application phase of the pseudo-sample synthesis model, the voices in the target speaker data set and the additional speaker data set are inputted into the speaker feature extraction model to obtain a speaker feature of the target speaker and a speaker feature of an additional speaker. The speech content feature and the speaker feature of the target speaker are inputted into the trained pseudo-sample synthesis model to obtain a pseudo-voice (which may also be referred to as a synthesized voice sample or a pseudo-sample) with timbre of the target speaker, the speech content feature and the speaker feature of the additional speaker are inputted into the trained pseudo-sample synthesis model to obtain a pseudo-voice with timbre of the additional speaker, and the pseudo-sample data set is generated based on the pseudo-voice with the timbre of the target speaker and the pseudo-voice with the timbre of the additional speaker.

In an embodiment, step S206 includes:

acquiring an initial voice feature corresponding to a first training object identifier as a first initial voice feature, and acquiring an initial voice feature corresponding to a second training object identifier as a second initial voice feature, voice content corresponding to the first initial voice feature and the second initial voice feature matching each other; acquiring a first weight corresponding to the first initial voice feature and a second weight corresponding to the second initial voice feature, where a sum of the first weight and the second weight is 1; and performing weighted fusion on the first initial voice feature and the second initial voice feature based on the first weight and the second weight to obtain a target voice feature.

Specifically, when generating the target voice feature, the computer device may acquire two initial voice features that belong to different training object identifiers and have corresponding voice content matching each other, and fuse the two initial voice features to obtain the target voice feature. The computer device may use an initial voice feature corresponding to a first training object identifier as a first initial voice feature, and use an initial voice feature corresponding to a second training object identifier as a second initial voice feature. Voice content corresponding to the first initial voice feature and the second initial voice feature matching each other, semantics corresponding to the first initial voice feature and the second initial voice feature are the same. During fusion, the computer device may perform weighted fusion on the two initial voice features to obtain a target voice feature. The computer device acquires a first weight corresponding to the first initial voice feature and a second weight corresponding to the second initial voice feature; and performs weighted fusion on the first initial voice feature and the second initial voice feature based on the first weight and the second weight to obtain a target voice feature.

A sum of the first weight and the second weight is 1. The sum of the first weight and the second weight is 1, so that it can be ensured that the target voice feature does not mutate.

In an embodiment, the first weight and the second weight may be fixed values set in advance, or the first weight and the second weight may be randomly generated random values.

In the foregoing embodiment, a target voice feature that has still matching voice content but different timbre may be obtained by fusing initial voice features that respectively correspond to the first training object identifier and the second training object identifier and have matching voice content. An accurate target voice feature can be quickly obtained by fusing the first initial voice feature and the second initial voice feature based on the first weight and the second weight whose sum is 1.

In an embodiment, each of the first initial voice feature and the second initial voice feature includes voice sub-features that respectively correspond to sequentially arranged voice frames of a target quantity, and the performing weighted fusion on the first initial voice feature and the second initial voice feature based on the first weight and the second weight to obtain a target voice feature includes:

performing weighted fusion on voice sub-features corresponding to voice frames of a same sequence number based on the first weight and the second weight in the first initial voice feature and the second initial voice feature, to obtain sequentially arranged target sub-features of the target quantity, where voice content corresponding to the voice sub-features corresponding to the voice frames of the same sequence number matches each other; and obtaining the target voice feature based on the sequentially arranged target sub-features of the target quantity.

Each of the first initial voice feature and the second initial voice feature includes voice sub-features that respectively correspond to sequentially arranged voice frames of a target quantity. The voice sub-features corresponding to the voice frames may be arranged according to a time order of the voice frames. Voice content corresponding to the voice sub-features corresponding to the voice frames of the same sequence number matches each other, that is, the first initial voice feature and the second initial voice feature are strictly aligned frame by frame, and content corresponding to each frame matches each other.

Specifically, during weighted fusion, the computer device may perform weighted fusion on voice sub-features corresponding to voice frames of a same sequence number based on the first weight and the second weight in the first initial voice feature and the second initial voice feature to obtain target sub-features. Because the initial voice feature includes voice sub-features that respectively correspond to sequentially arranged voice frames of a target quantity, the sequentially arranged target sub-features of the target quantity may be eventually obtained. Because the first initial voice feature and the second initial voice feature are strictly aligned frame by frame, in this case, voice content of the target sub-feature obtained through fusion based on the first weight and the second weight whose sum is 1 and voice content of an initial sub-feature configured for fusion strictly match. Finally, the computer device combines the sequentially arranged target sub-features of the target quantity to obtain the target voice feature. It may be understood that, the voice content of the target voice feature and the voice content of the first initial voice feature and the second initial voice feature match each other and are aligned frame by frame and strictly match frame by frame, corresponding frames of the target voice feature, the first initial voice feature, and the second initial voice feature have the same semantic information but have different timbre information.

In an embodiment, the first initial voice feature and the second initial voice feature may be initial voice features corresponding to different synthesized voice samples generated based on a same voice content feature. The synthesized voice samples generated based on the same voice content feature are completely aligned in a time dimension. Correspondingly, the first initial voice feature and the second initial voice feature generated based on the synthesized voice sample are also strictly aligned frame by frame in the time dimension, and voice content corresponding to each frame is same. Further, a target voice feature with new timbre information may be synthesized by fusing the first initial voice feature and the second initial voice feature based on the first weight and the second weight whose sum is 1 without changing information of the voice content.

In the foregoing embodiment, each of the first initial voice feature and the second initial voice feature includes voice sub-features that respectively correspond to sequentially arranged voice frames of a target quantity, voice sub-features corresponding to voice frames of a same sequence number are fused based on the first weight and the second weight in the first initial voice feature and the second initial voice feature, to obtain sequentially arranged target sub-features of the target quantity, where voice content corresponding to the voice sub-features corresponding to the voice frames of the same sequence number matches each other; and the target voice feature is obtained based on the sequentially arranged target sub-features of the target quantity. In this way, corresponding frames of an initial voice feature with matching voice content have matching voice content but have different timbre information, and the target voice feature with new timbre information may be synthesized by fusing voice sub-features of the corresponding frames without changing the information of the voice content.

In a specific embodiment, the target voice feature may be calculated by using the following formula:

$$PPG_{aug} = \lambda PPG_{s0} + (1 - \lambda)PPG_{s1},$$

where $PPG_{aug}$ denotes the target voice feature. $PPG_{s0}$ denotes the first initial voice feature, and $PPG_{s1}$ denotes the second initial voice feature. Although $PPG_{s0}$ and $PPG_{s1}$ correspond to different training object identifiers, corresponding voice content matches each other. $\lambda$ indicates the first weight, and $(1-\lambda)$ denotes the second weight.

In an embodiment, $\lambda$ may be randomly generated. $\lambda$ may be enabled to conform to one Beta distribution with a parameter $\alpha$ (which may also be referred to as a beta distribution), that is, $\lambda \sim$Beta $(\alpha,\alpha)$. $\alpha$ is configured for controlling a shape of the Beta distribution.

Figure 4:
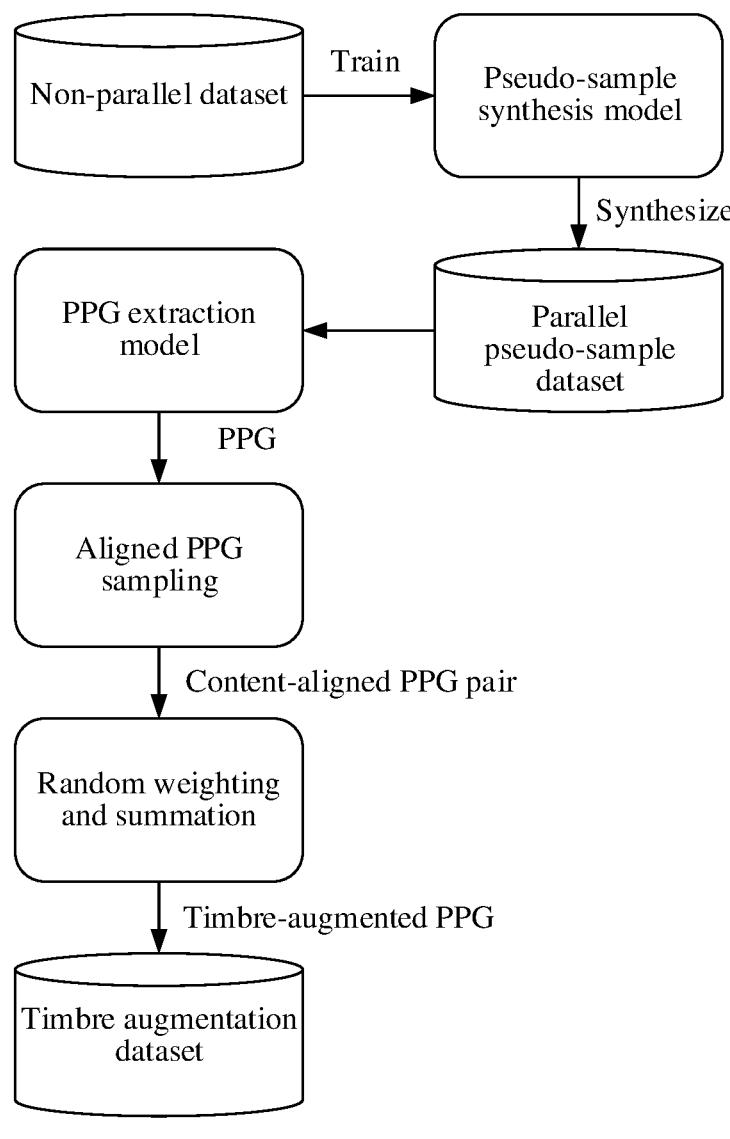
FIG. 4 is a schematic flowchart of timbre augmentation according to an embodiment of the present disclosure.

In a specific embodiment, FIG. 4 shows a specific process of timbre augmentation. A pseudo-sample is synthesized based on an existing non-parallel data set, and timbre augmentation is performed on the pseudo-sample to obtain a timbre-augmented data set.

1. Train a Pseudo-Sample Synthesis Model

A pseudo-sample synthesis model is based on a trained non-parallel data set. The non-parallel data set records voice samples that are from different speakers and have different voice content.

2. Synthesize a Parallel Pseudo-Sample Dataset

A pseudo-sample data set with parallel content is synthesized by using a trained pseudo-sample synthesis model. A parallel pseudo-sample data set includes pseudo-samples that are of different speakers and have same voice content.

3. Extract a PPG Feature (which May Also be Referred to as a Voice Feature) of a Pseudo-Sample A PPG feature of a pseudo-sample is extracted by using a pretrained PPG extraction model. A phonetic posteriorgram (PPG) is a feature extracted by using a pretrained voice recognition model and based on a voice, and the phonetic posteriorgram has information in two dimensions (a time dimension and a feature dimension). For example, the PPG feature is indicated by using a matrix of [425, 256]. The time dimension is 425, indicating that for the PPG feature, the voice is segmented into 425 frames. The feature dimension is 256, indicating that a feature corresponding to each frame is formed by 256 pieces of data.

4. Sample an Aligned PPG Feature

Two speakers (which may include a target speaker) are randomly extracted and denoted as s0 and s1. A pair of PPG features with same voice content are randomly selected from PPG features corresponding to the two speakers, and are respectively denoted as $PPG_{s0}$ and $PPG_{s1}$.

5. Perform Random Value Assignment and Summation on Sampled PPG Features

A weight coefficient $\lambda$ is calculated, and weighted summation is performed on $PPG_{s0}$ and $PPG_{s1}$ based on the weight coefficient $\lambda$, and a calculation formula is as follows:

$$PPG_{aug} = \lambda PPG_{s0} + (1 - \lambda)PPG_{s1}.$$

6. Generate a Timbre Augmentation Data Set

A timbre augmentation data set is formed by $PPG_{aug}$.

In this embodiment, a PPG feature and a corresponding voice have a frame-to-frame correspondence relationship. When a parallel pseudo-sample data set is synthesized based on voice content of a source speaker, voices that have different timbre and same voice content are completely aligned in a time dimension. Similarly, the PPG feature is also strictly aligned frame by frame in a time dimension, and voice content corresponding to each frame is same. Therefore, frames corresponding to a PPG with same content have same voice content, but have different timbre information. A PPG feature with new timbre information may be synthesized through a timbre augmentation method without changing the information of the voice content.

In an embodiment, as shown in FIG. 5, step S210 includes the following steps:

Step S502: Determine a plurality of training voice feature pairs from the voice feature set, and determine a target voice feature pair from the training voice feature pairs, where a first training voice feature and a second training voice feature that belong to a same training voice feature pair correspond to voice content matching each other and correspond to different voice timbre.

The training voice feature pair includes a pair of training voice features, and the training voice features are voice features in the voice feature set. In addition, the training voice features in the training voice feature pair correspond to voice content matching each other and correspond to different voice timbre. The target voice feature pair is a training voice feature pair randomly selected from the training voice feature pairs.

Specifically, in addition to training of one initial voice conversion model based on a voice feature set, to improve training efficiency and training quality, the computer device may further synchronously train and jointly train two initial voice conversion models based on the voice feature set, to perform training once to obtain two target voice conversion models.

To synchronously train the two initial voice conversion models, the computer device needs to generate training data in pairs for the models. Therefore, the computer device may acquire two training voice features that have voice content matching each other and different voice timbre from the voice feature set to form one training voice feature pair. The computer device may determine a plurality of training voice feature pairs from the voice feature set. One training voice feature in the training voice feature pair is configured for being inputted into a first initial voice conversion model, and the other training voice feature is configured for being inputted into a second initial voice conversion model. It may be understood that, when training voice features are acquired from the voice feature set to generate a training voice feature pair, data may be acquired in a manner with placement, or data may be acquired in manner without placement.

During training, the computer device may iteratively train the two initial voice conversion models. During each round of training, one training voice feature in a target voice feature pair in the current round is inputted into the first initial voice conversion model, the other training voice feature is inputted into the second initial voice conversion model, loss information is generated based on intermediate processing data and final processing data of the two initial voice conversion models, and model parameters of the two initial voice conversion models are adjusted based on the loss information. During a next round of training, a new training voice feature pair is acquired as a target voice feature pair, one training voice feature in a new target voice feature pair is inputted into the first initial voice conversion model with the model parameter adjusted in the previous round of training, the other training voice feature is inputted into the second initial voice conversion model with the model parameter adjusted in the previous round of training, loss information is generated based on intermediate processing data and final processing data of the two initial voice conversion models, and model parameters of the two initial voice conversion models are adjusted based on the loss information. Such iterative training is performed until a convergence condition is met, to obtain the two target voice conversion models.

Step S504: Input a first training voice feature in the target voice feature pair into a first initial voice conversion model to obtain first intermediate voice data and first predicted voice data, and input a second training voice feature in the target voice feature pair into a second initial voice conversion model to obtain second intermediate voice data, where the first predicted voice data is obtained based on the first intermediate voice data.

The first intermediate voice data is an intermediate processing result of the first initial voice conversion model, and the first predicted voice data is a final processing result and a final output result of the first initial voice conversion model. The first predicted voice data is obtained based on the first intermediate voice data. Correspondingly, the second intermediate voice data is an intermediate processing result of the second initial voice conversion model.

Specifically, the computer device may input the first training voice feature in the target voice feature pair into the first initial voice conversion model, acquire an intermediate processing result of the first initial voice conversion model as the first intermediate voice data, and acquire a final processing result of the first initial voice conversion model as the first predicted voice data. The computer device may input the second training voice feature in the target voice feature pair into the second initial voice conversion model, and acquire the intermediate processing result of the second initial voice conversion model as the second intermediate voice data.

In an embodiment, the initial voice conversion model may include a first processing layer and a second processing layer. The first processing layer is configured to acquire an inputted training voice feature, convert the training voice feature into intermediate voice data, and input the intermediate voice data into the second processing layer. The second processing layer is configured to convert the intermediate voice data into predicted voice data and output the predicted voice data.

Step S506: Use voice data that corresponds to a target object identifier and whose voice content and voice content corresponding to the target voice feature pair match each other as target voice data.

Specifically, the computer device may acquire voice data that corresponds to a target object identifier and whose voice content and voice content corresponding to the target voice feature pair match each other as target voice data, and use the target voice data as an expected final processing result of the initial voice conversion model.

It may be understood that, the voice data whose voice content and voice content corresponding to the target voice feature pair match each other may be voice data whose voice content and voice content corresponding to any target voice feature in the target voice feature pair match each other.

Step S508: Generate a first loss based on a difference between the first intermediate voice data and the second intermediate voice data, and generate a second loss based on a difference between the first predicted voice data and the target voice data.

Specifically, the computer device may calculate the first loss based on the difference between the first intermediate voice data and the second intermediate voice data, and calculate the second loss based on the difference between the first predicted voice data and the target voice data. The first loss is configured for improving a processing capability of input data with various timbre by the model, so that the model can flexibly convert various timbre into target timbre, and the second loss is configured for improving a processing capability of convert input timbre into target timbre by the model, so that the model can convert input timbre into target timbre.

In an embodiment, the computer device may calculate at least one error such as a difference value, a mean square error, or a root mean square error between the first intermediate voice data and the second intermediate voice data to obtain the first loss, and calculate at least one error such as a difference value, a mean square error, or a root mean square error between the first predicted voice data and the target voice data to obtain the second loss.

Step S510: Adjust a model parameter of the first initial voice conversion model and a model parameter of the second initial voice conversion model based on the first loss and the second loss to obtain a first intermediate voice conversion model and a second intermediate voice conversion model.

Specifically, the computer device may perform back propagation and update based on the first loss and the second loss, adjust the model parameters of the first initial voice conversion model and the second initial voice conversion model, use the adjusted first initial voice conversion model as the first intermediate voice conversion model, and use the adjusted second initial voice conversion model as the second intermediate voice conversion model.

According to an embodiment of the present disclosure, the computer device may generate a target loss based on the first loss and the second loss, and the first initial voice conversion model and the second initial voice conversion model may be adjusted based on the target loss to different adjustment extents. According to an embodiment of the present disclosure, the computer device may first adjust the first initial voice conversion model based on the target loss, and then adjust the second initial voice conversion model based on the adjusted first initial voice conversion model.

Step S512: Use the first intermediate voice conversion model as the first initial voice conversion model, use the second intermediate voice conversion model as the second initial voice conversion model, use a next training voice feature pair as the target voice feature pair, and return to perform the step of inputting a first training voice feature in the target voice feature pair into a first initial voice conversion model until a first convergence condition is met, to obtain a first target voice conversion model and a second target voice conversion model.

Specifically, after obtaining the first intermediate voice conversion model and the second intermediate voice conversion model, the computer device may use the first intermediate voice conversion model as the first initial voice conversion model, use the second intermediate voice conversion model as the second initial voice conversion model, use a next training voice feature pair as the target voice feature pair, return to perform the step of inputting a first training voice feature in the target voice feature pair into a first initial voice conversion model, to obtain a new first intermediate voice conversion model and second intermediate voice conversion model, then use the new first intermediate voice conversion model and second intermediate voice conversion model as a new first initial voice conversion model and a new second initial voice conversion model respectively, acquire a new target voice feature pair to be inputted into the new first initial voice conversion model and second initial voice conversion model, perform such iterative training by analogy, until a first convergence condition is met, to obtain a first target voice conversion model and a second target voice conversion model. The first target voice conversion model and the second target voice conversion model may both be configured to convert input data corresponding to any timbre into voice data corresponding to target timbre.

In an embodiment, in each round of training, there may be at least one target voice feature pair. In each round of training, the computer device may obtain first intermediate voice data, second intermediate voice data, first predicted voice data, and target voice data corresponding to a same target voice feature pair, and the computer device may calculate a first sub-loss based on the first intermediate voice data and the second intermediate voice data corresponding to the same target voice feature pair to obtain first sub-losses that respectively correspond to the target voice feature pairs, and obtain the first loss based on the first sub-losses. The computer device may calculate a second sub-loss based on the first predicted voice data and the target voice data corresponding to the same target voice feature pair to obtain second sub-losses that respectively correspond to the target voice feature pairs, and obtain the second loss based on the second sub-losses.

In the foregoing embodiment, a plurality of training voice feature pairs are determined from a voice feature set, and joint training is performed on a first initial voice conversion model and a second initial voice conversion model based on the training voice feature pairs, so that a first target voice conversion model and a second target voice conversion model are obtained at once, thereby improving model training efficiency. During training, a target voice feature pair is determined from each training voice feature pair, a first training voice feature in the target voice feature pair is inputted into a first initial voice conversion model to obtain first intermediate voice data and first predicted voice data, and a second training voice feature in the target voice feature pair is inputted into a second initial voice conversion model to obtain second intermediate voice data. Voice data that corresponds to a target object identifier and whose voice content and voice content corresponding to the target voice feature pair match each other is used as target voice data, a first loss is generated based on a difference between the first intermediate voice data and the second intermediate voice data, and a second loss is generated based on a difference between the first predicted voice data and the target voice data, a model parameter of the first initial voice conversion model and a model parameter of the second initial voice conversion model are adjusted based on the first loss and the second loss to obtain a first intermediate voice conversion model and a second intermediate voice conversion model, the first intermediate voice conversion model is used as the first initial voice conversion model, the second intermediate voice conversion model is used as the second initial voice conversion model, a next training voice feature pair is used as the target voice feature pair, and the step of inputting a first training voice feature in the target voice feature pair into a first initial voice conversion model is performed again until a first convergence condition is met, to obtain a first target voice conversion model and a second target voice conversion model. In this way, for a second loss adjustment model generated based on a difference between first predicted voice data and target voice data, output data of the model may be enabled to keep approaching an expected result, so that the trained model can convert input data into voice data with target timbre. For a first loss adjustment model generated based on a difference on first intermediate voice data and second intermediate voice data, the model may be enabled to make mapping positions of input data with matching content information and different timbre information to keep approaching in a feature space, so that the trained model can implement more stable voice conversion for input data with different timbre, thereby effectively improving voice conversion accuracy of the model. The first target voice conversion model and the second target voice conversion model that are obtained through model training based on a first loss and a second loss have high voice conversion accuracy.

In an embodiment, step S504 includes:

inputting the first training voice feature in the target voice feature pair into an encoder in the first initial voice conversion model to obtain the first intermediate voice data; inputting the first intermediate voice data into a decoder in the first initial voice conversion model to obtain the first predicted voice data; and inputting the second training voice feature in the target voice feature pair into an encoder in the second initial voice conversion model to obtain the second intermediate voice data.

The encoder is configured to extract useful information in an input feature, and map the input feature into a more abstract semantic space to obtain an intermediate feature. The decoder is configured to parse the intermediate feature to complete reconstruction of voice data. The first initial voice conversion model includes an encoder and a decoder. The second initial voice conversion model includes an encoder and a decoder.

Specifically, the computer device may input the first training voice feature in the target voice feature pair into the encoder in the first initial voice conversion model. Through data processing of the encoder, the encoder outputs the first intermediate voice data. The encoder inputs the first intermediate voice data into the decoder in the first initial voice conversion model. Through data processing of the decoder, the decoder outputs the first predicted voice data. The computer device may input the second training voice feature in the target voice feature pair into the encoder in the second initial voice conversion model. Through data processing of the encoder, the encoder outputs the second intermediate voice data.

In the foregoing embodiment, the initial voice conversion model includes an encoder and a decoder. The encoder is configured to quickly process an input voice feature to obtain intermediate voice data, and the decoder is configured to quickly process the intermediate voice data to obtain output voice data and predicted voice data.

In an embodiment, step S510 includes:

generating a target loss based on the first loss and the second loss; adjusting the model parameter of the first initial voice conversion model based on the target loss to obtain the first intermediate voice conversion model; and adjusting a model parameter corresponding to the second initial voice conversion model based on a model parameter of the first intermediate voice conversion model to obtain the second intermediate voice conversion model.

Specifically, the computer device may generate the target loss based on the first loss and the second loss, first adjust the first initial voice conversion model based on the target loss, and then adjust the second initial voice conversion model based on the adjusted first initial voice conversion model, to obtain the first intermediate voice conversion model and the second intermediate voice conversion model.

The computer device may first calculate the target loss based on the first loss and the second loss, for example, may calculate a sum of the first loss and the second loss as the target loss, or may perform weighted summation on the first loss and the second loss to obtain the target loss. Further, the computer device may perform back propagation based on the target loss to adjust the model parameter of the first initial voice conversion model, and use the adjusted first initial voice conversion model as the first intermediate voice conversion model. Furthermore, the computer device may adjust the model parameter corresponding to the second initial voice conversion model based on the model parameter of the first intermediate voice conversion model to obtain the second intermediate voice conversion model.

In the foregoing embodiment, a target loss is generated based on the first loss and the second loss; the model parameter of the first initial voice conversion model is adjusted based on the target loss to obtain the first intermediate voice conversion model; and a model parameter corresponding to the second initial voice conversion model is adjusted based on a model parameter of the first intermediate voice conversion model to obtain the second intermediate voice conversion model. In this way, the first initial voice conversion model is first adjusted, so that data processing accuracy of the first initial voice conversion model can be improved, and then the second initial voice conversion model is adjusted based on an adjustment result of the first initial voice conversion model, so that the second initial voice conversion model performs learning and approaches toward the adjusted first initial voice conversion model, thereby improving data processing accuracy of the second initial voice conversion model.

In an embodiment, the generating a target loss based on the first loss and the second loss includes:

acquiring a loss weight corresponding to the first loss;
adjusting the first loss based on the loss weight to obtain an updated loss; and obtaining the target loss based on the second loss and the updated loss.

Specifically, during calculation of the target loss, to further improve processing stability of input data with different timbre by the model, the impact of the first loss in the adjustment of a model parameter can be improved. The computer device may adjust the first loss based on the loss weight corresponding to the first loss, use the adjusted first loss as the updated loss, and obtain the target loss based on the second loss and the updated loss.

In an embodiment, the loss weight corresponding to the first loss increases as a quantity of rounds of model training increases and increases as a quantity of model iterations increases. As the quantity of rounds of model training increases, to further improve stability and accuracy of processing input data with different timbre by the model, the loss weight corresponding to the first loss can be improved, so that the impact of the first loss in the adjustment of a model parameter is improved, thereby improving the generalization ability of a model. It may be understood that, the loss weight corresponding to the first loss increases as the quantity of rounds of model training increases, and may increase linearly as the quantity of rounds of model training increases. For example, after each round, the loss weight is doubled. The loss weight corresponding to the first loss increases as the quantity of rounds of model training increases, and may increase non-linearly as the quantity of rounds of model training increases. For example, after each round, the loss weight is increased by a preset adjustment value.

The quantity of rounds of model training indicates a quantity of times of iterative training in a model training process. It may be understood that, performing steps S504 to S510 once is performing one round of model training and iterative training once.

In an embodiment, when a current round number of model training is less than or equal to a preset quantity of rounds, the loss weight corresponding to the first loss remains unchanged; and when the current round number of model training is greater than the preset quantity of rounds, the loss weight corresponding to the first loss increases as a quantity of rounds of model training increases.

Specifically, the loss weight corresponding to the first loss may be first kept unchanged, and after several rounds of model training, the loss weight corresponding to the first loss then increases as the quantity of rounds of model training increases. That is, when a current round number of model training is less than or equal to a preset quantity of rounds, the loss weight corresponding to the first loss remains unchanged; and when the current round number of model training is greater than the preset quantity of rounds, the loss weight corresponding to the first loss increases as a quantity of rounds of model training increases. The current round number of model training is a training round number of current model training. The preset quantity of rounds is a quantity of rounds set in advance, and may be set according to an actual requirement. For example, the preset quantity of rounds is set to 10. At the $10^{th}$ round of model training, that is, when the current round number of model training is the $10^{th}$ round, the loss weight corresponding to the first loss is a preset fixed weight. At the $11^{th}$ round of model training, that is, when the current round number of model training is the $11^{th}$ round, the loss weight corresponding to the first loss is obtained by adding an adjustment value to the preset fixed weight. In this way, the loss weight corresponding to the first loss is first kept unchanged. The model may first converge stably, to provide the model with certain accuracy, and then the loss weight corresponding to the first loss is increased, to enable the model to focus on learning a feature representation unrelated to voice timbre, thereby improving robustness of the model for input data with different timbre. The preset quantity of rounds is a training round quantity threshold set in advance, and the training round quantity threshold may be specifically set according to an actual requirement.

In the foregoing embodiment, the loss weight corresponding to the first loss is acquired, the loss weight increases as the quantity of rounds of model training increases, and the first loss is adjusted based on the loss weight to obtain an updated loss; and the target loss is obtained based on the second loss and the updated loss. Through adjustment of a model parameter based on such a target loss, the model can focus on learning a feature representation unrelated to voice timbre, thereby improving generalization ability of the model.

In a specific embodiment, a calculation formula of the target loss is as follows:

$$L = L_m + \gamma L_c,$$

where L denotes the target loss, $L_c$ denotes the first loss, $L_m$ denotes the second loss, $\gamma$ denotes the loss weight corresponding to the first loss, and $\gamma$ increases as the quantity of rounds of training increases.

In an embodiment, model parameters having a matching relationship exist between the first intermediate voice conversion model and the second initial voice conversion model, and the adjusting a model parameter corresponding to the second initial voice conversion model based on a model parameter of the first intermediate voice conversion model to obtain the second intermediate voice conversion model includes:

using the model parameters having a matching relationship that exist in the first intermediate voice conversion model and the second initial voice conversion model as a first model parameter and a second model parameter respectively; fusing the first model parameter and the second model parameter having a matching relationship that exist to obtain a target model parameter; and replacing the corresponding model parameter in the second initial voice conversion model based on the target model parameter to obtain the second intermediate voice conversion model.

Model parameters having a matching relationship exist between the first initial voice conversion model and the second initial voice conversion model. Correspondingly, model parameters having a matching relationship exist between the first intermediate voice conversion model and the second initial voice conversion model. The first model parameter is a model parameter in the first intermediate voice conversion model. The second model parameter is a model parameter in the second initial voice conversion model, and a matching relationship exists between the first model parameter and the second model parameter.

Specifically, during adjustment of the model parameter corresponding to the second initial voice conversion model, the computer device may use the model parameters that have a matching relationship and exist between the first intermediate voice conversion model and the second initial voice conversion model as the first model parameter and the second model parameter respectively, fuse the first model parameter and the second model parameter having a matching relationship to obtain the target model parameter, for example, and may perform weighted summation on the first model parameter and the second model parameter to obtain the target model parameter, or may use a sum of a weighted summation result and a preset value as the target model parameter or the like. Further, the computer device may replace a corresponding model parameter in the second initial voice conversion model based on the target model parameter to obtain the second intermediate voice conversion model.

It may be understood that, a plurality of model parameters having a matching relationship exist between the first intermediate voice conversion model and the second initial voice conversion model, and the computer device may obtain a plurality of target model parameters, and may replace corresponding model parameters in the second initial voice conversion model based on the target model parameters respectively, to obtain the second intermediate voice conversion model.

In an embodiment, the first initial voice conversion model and the second initial voice conversion model have the same model structures. The model parameters of the first initial voice conversion model correspond one-to-one to the model parameters of the second initial voice conversion model, and a matching relationship exists between corresponding model parameters.

In the foregoing embodiment, the model parameters having a matching relationship that exist in the first intermediate voice conversion model and the second initial voice conversion model are used as a first model parameter and a second model parameter respectively; the first model parameter and the second model parameter having a matching relationship that exist are fused to obtain a target model parameter; and the corresponding model parameter in the second initial voice conversion model is replaced based on the target model parameter to obtain the second intermediate voice conversion model. In this way, based on the model parameter of the first intermediate voice conversion model, a model parameter that matches the model parameter of the first intermediate voice conversion model and is in the second initial voice conversion model is adjusted, and an intermediate processing result outputted by the second initial voice conversion model may gradually approach an intermediate processing result of the first intermediate voice conversion model, so that intermediate processing results corresponding to input data with different timbre are similar, that is, the first voice conversion model and the second voice conversion model gradually learn a feature representation unrelated to voice timbre.

In an embodiment, the first initial voice conversion model and the second initial voice conversion model are two models that have a same model structure and have a same quantity of model parameters. The model parameters of the first initial voice conversion model correspond one-to-one to the model parameters of the second initial voice conversion model. It is assumed that the first initial voice conversion model is a teacher model, and the second initial voice conversion model is a student model. One parameter of the teacher model is $t_{param}$, and one corresponding parameter $s_{param}$ can also be found at a same position in the student model. It is assumed that the second weight is a, and update of data of $s_{param}$ may be represented as:

$$s'_{param} = a * s_{param} + (1-a) * t_{param},$$

where $s_{param}'$ denotes updated and adjusted data. During each time of update and each time of adjustment, model parameters in the student model are sequentially updated in the foregoing manner.

Figure 6:
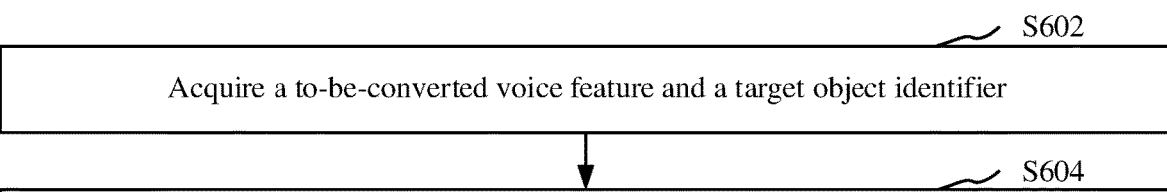
FIG. 6 is a schematic flowchart of a voice conversion method according to an embodiment of the present disclosure.

According to an embodiment of the present disclosure, as shown in FIG. 6, a voice conversion method is provided. An example in which the method is applied to a computer device is used for description. It may be understood that, the computer device may be the terminal 102 in FIG. 1, or may be the server 104. The voice conversion method includes the following steps:

Step S602: Acquire a to-be-converted voice feature and a target object identifier.

The to-be-converted voice feature is a voice feature whose voice timbre needs to be converted. The to-be-converted voice feature may be a voice feature obtained by performing feature extraction on a voice sample. The voice sample corresponding to the to-be-converted voice feature may be a voice collected by a voice collection device in real time. For example, when sending a voice message, a user may select a target character to send a voice message with target timbre corresponding to the target character. A voice message that is recorded by the user in real time and has timbre of the user may be used as a to-be-converted voice message, voice timbre corresponding to the target character selected by the user is used as the target timbre, the to-be-converted voice message is converted in real time into a target voice message with the target timbre, and the target voice message is sent. The voice sample corresponding to the to-be-converted voice feature may be a voice recorded in advance. For example, original timbre corresponding to audio is converted into the target timbre.

The target object identifier is an object identifier corresponding to a target object. The target object is an object with the target timbre. The voice timbre corresponding to the to-be-converted voice feature needs to be converted into voice timbre corresponding to the target object. For example, the target character selected by the user may be used as the target object, and an object identifier corresponding to the target character is used as the target object identifier.

Specifically, the computer device may acquire the to-be-converted voice feature and the target object identifier locally or from another device, to further use a target voice conversion model corresponding to the target object identifier to convert the voice timbre corresponding to the to-be-converted voice feature into voice timbre corresponding to the target object identifier.

Step S604: Input the to-be-converted voice feature into a target voice conversion model corresponding to the target object identifier to obtain converted voice data, voice content corresponding to the converted voice data and voice content corresponding to the to-be-converted voice feature matching each other, voice timbre corresponding to the converted voice data and voice timbre corresponding to the target object identifier matching each other.

The target voice conversion model is a trained voice conversion model. A training process of the target voice conversion model including the following steps: acquiring a voice sample set, the voice sample set including a plurality of training voice samples that respectively correspond to a plurality of training object identifiers, each of the plurality of training voice samples corresponding to one of a plurality of pieces of voice content, at least one training voice sample in the voice sample set being a synthesized voice sample, the synthesized voice sample being obtained by performing voice sample synthesis on a preset voice content feature and a voice timbre feature corresponding to a training object identifier; extracting voice features of the training voice samples to obtain initial voice features that respectively correspond to the training voice samples; fusing initial voice features that belong to different training object identifiers and have corresponding voice content matching each other to obtain target voice features; obtaining a voice feature set based on the target voice features; and inputting a voice feature in the voice feature set into an initial voice conversion model to obtain predicted voice data, and adjusting a model parameter of the initial voice conversion model based on a difference between the predicted voice data and target voice data corresponding to the target object identifier until a first convergence condition is met, to obtain the target voice conversion model, input data of the initial voice conversion model and voice content corresponding to the target voice data matching each other.

It may be understood that, for a specific training process of the target voice conversion model, refer to the content of the embodiments of the foregoing method for training a voice conversion model. Details are not described herein again.

The converted voice data is voice data with the voice timbre corresponding to the target object identifier. The converted voice data may be directly a voice, or may be spectral data of a voice, and the spectral data is subsequently converted into a voice. The voice timbre corresponding to the converted voice data and the voice timbre corresponding to the target object identifier match each other. The matching voice timbre may be completely consistent voice timbre or may be very similar voice timbre.

Specifically, the computer device may input the to-be-converted voice feature into the target voice conversion model corresponding to the target object identifier, and through data processing of the target voice conversion model, the target voice conversion model outputs the converted voice data. The target voice conversion model may convert voice timbre corresponding to input data into the voice timbre corresponding to the target object identifier on the basis of ensuring that a semantic of the input data is not changed. The voice content corresponding to the finally obtained converted voice data and the voice content corresponding to the to-be-converted voice feature match each other, and the voice timbre corresponding to the converted voice data and the voice timbre corresponding to the target object identifier match each other.

In an embodiment, the computer device may acquire a voice conversion task, the voice conversion task includes a to-be-converted voice and a target object identifier, a voice feature of the to-be-converted voice is extracted to obtain a to-be-converted voice feature, a target voice conversion model corresponding to the target object identifier is acquired, the to-be-converted voice feature is inputted into the target voice conversion model, and the target voice conversion model outputs converted voice data. The voice conversion task may be submitted by the user with the terminal.

In the foregoing voice conversion method, through a target voice conversion model, on the basis of keeping voice content corresponding to a current object identifier, voice timbre can be converted from timbre corresponding to the current object identifier into timbre corresponding to a target object identifier. A training set for the target voice conversion model is generated based on a synthesized voice sample and through timbre augmentation. The trained target voice conversion model has better voice conversion accuracy, so that more accurate voice conversion can be implemented by using the target voice conversion model, to obtain relatively accurate converted voice data. For the target voice conversion model, initial voice features that belong to different training object identifiers and have corresponding voice content matching each other are fused to obtain target voice features, so that timbre augmentation can be implemented, to obtain a target voice feature whose voice content matches the initial voice features and has new timbre. In addition, the initial voice features include a voice feature extracted from a synthesized voice sample. The synthesized voice sample is a pseudo-sample. The pseudo-sample is not a real voice sample. The pseudo-sample helps to reduce collection pressure of voice samples, increase a data amount of voice samples, and increase a data amount of initial voice features, so that target voice features corresponding to various timbre can be obtained through timbre augmentation. A voice feature set formed by voice features corresponding to various timbre is used as a training set for a voice conversion model, so that training quality of the voice conversion model can be effectively improved. The model is enabled to learn conversion between different timbre, to reduce a risk of overfitting of specific timbre by the model, thereby effectively improving voice conversion accuracy of the voice conversion model.

In an embodiment, as shown in FIG. 7, a method for training a voice conversion model is provided. An example in which the method is applied to a computer device is used for description. It may be understood that, the computer device may be the terminal 102 in FIG. 1, or may be the server 104. The method for training a voice conversion model includes the following steps:

Step S702: Acquire a plurality of training voice feature pairs, and determine a target voice feature pair from the training voice feature pairs, a first training voice feature and a second training voice feature that belong to a same training voice feature pair corresponding to voice content matching each other and corresponding to different voice timbre.

The training voice feature pair includes a pair of training voice features. The training voice feature pair may be generated based on an original voice sample, for example, real voices that have voice content matching each other but different voice timbre are collected, and voice features of the real voices are extracted to obtain the training voice feature.

For the generation of the training voice feature pair, refer to the content of the related embodiments of the foregoing method for training a voice conversion model. Details are not described herein again.

The target voice feature pair is a training voice feature pair randomly selected from the training voice feature pairs.

Specifically, the computer device may synchronously train and jointly train two initial voice conversion models based on training voice feature pairs, to perform training once to obtain two target voice conversion models.

During training, the computer device may iteratively train the two initial voice conversion models. During each round of training, one training voice feature in a target voice feature pair in the current round is inputted into the first initial voice conversion model, the other training voice feature is inputted into the second initial voice conversion model, loss information is generated based on intermediate processing data and final processing data of the two initial voice conversion models, and model parameters of the two initial voice conversion models are adjusted based on the loss information. During a next round of training, a new training voice feature pair is acquired as a target voice feature pair, one training voice feature in a new target voice feature pair is inputted into the first initial voice conversion model with the model parameter adjusted in the previous round of training, the other training voice feature is inputted into the second initial voice conversion model with the model parameter adjusted in the previous round of training, loss information is generated based on intermediate processing data and final processing data of the two initial voice conversion models, and model parameters of the two initial voice conversion models are adjusted based on the loss information. Such iterative training is performed until a convergence condition is met, to obtain the two target voice conversion models.

Step S704: Input a first training voice feature in the target voice feature pair into a first initial voice conversion model to obtain first intermediate voice data and first predicted voice data, and input a second training voice feature in the target voice feature pair into a second initial voice conversion model to obtain second intermediate voice data, where the first predicted voice data is obtained based on the first intermediate voice data.

Specifically, the computer device may input the first training voice feature in the target voice feature pair into the first initial voice conversion model, acquire an intermediate processing result of the first initial voice conversion model as the first intermediate voice data, and acquire a final processing result of the first initial voice conversion model as the first predicted voice data. The computer device may input the second training voice feature in the target voice feature pair into the second initial voice conversion model, and acquire the intermediate processing result of the second initial voice conversion model as the second intermediate voice data.

Step S706: Use voice data that corresponds to a target object identifier and whose voice content and voice content corresponding to the target voice feature pair match each other as target voice data.

Specifically, the computer device may acquire voice data that corresponds to a target object identifier and whose voice content and voice content corresponding to the target voice feature pair match each other as target voice data, and use the target voice data as an expected final processing result of the initial voice conversion model.

It may be understood that, if a training voice feature pair is generated based on an original voice sample with known voice content, in this case, voice content corresponding to a target voice feature generated based on the training voice feature pair is the voice content corresponding to the corresponding original voice sample. In this case, during acquisition of target voice data, a voice whose voice content and the voice content corresponding to the target voice feature match each other may be acquired from a plurality of voices corresponding to a target object identifier as the target voice data. For example, a voice whose voice content and the voice content corresponding to the target voice feature are consistent is acquired as the target voice data.

For the generation of the training voice feature pair, refer to the content of the related embodiments of the foregoing method for training a voice conversion model. In this case, for an acquisition process of the target voice data, refer to the acquisition process of the target voice data in the foregoing method for training a voice conversion model.

Step S708: Generate a first loss based on a difference between the first intermediate voice data and the second intermediate voice data, and generate a second loss based on a difference between the first predicted voice data and the target voice data.

Specifically, the computer device may calculate the first loss based on the difference between the first intermediate voice data and the second intermediate voice data, and calculate the second loss based on the difference between the first predicted voice data and the target voice data. The first loss is configured for improving a processing capability of input data with various timbre by the model, so that the model can flexibly convert various timbre into target timbre, and the second loss is configured for improving a processing capability of convert input timbre into target timbre by the model, so that the model can convert input timbre into target timbre.

Step S710: Adjust a model parameter of the first initial voice conversion model and a model parameter of the second initial voice conversion model based on the first loss and the second loss to obtain a first intermediate voice conversion model and a second intermediate voice conversion model.

Specifically, the computer device may perform back propagation and update based on the first loss and the second loss, adjust the model parameters of the first initial voice conversion model and the second initial voice conversion model, use the adjusted first initial voice conversion model as the first intermediate voice conversion model, and use the adjusted second initial voice conversion model as the second intermediate voice conversion model.

Step S712: Use the first intermediate voice conversion model as the first initial voice conversion model, use the second intermediate voice conversion model as the second initial voice conversion model, use a next training voice feature pair as the target voice feature pair, and return to perform the step of inputting a first training voice feature in the target voice feature pair into a first initial voice conversion model until a target convergence condition is met, to obtain a first target voice conversion model and a second target voice conversion model, voice timbre corresponding to output data of the first target voice conversion model and the second target voice conversion model and voice timbre corresponding to the target object identifier matching each other.

Specifically, after obtaining the first intermediate voice conversion model and the second intermediate voice conversion model, the computer device may use the first intermediate voice conversion model as the first initial voice conversion model, use the second intermediate voice conversion model as the second initial voice conversion model, use a next training voice feature pair as the target voice feature pair, return to perform the step of inputting a first training voice feature in the target voice feature pair into a first initial voice conversion model, to obtain a new first intermediate voice conversion model and second intermediate voice conversion model, then use the new first intermediate voice conversion model and second intermediate voice conversion model as a new first initial voice conversion model and a new second initial voice conversion model respectively, acquire a new target voice feature pair to be inputted into the new first initial voice conversion model and second initial voice conversion model, perform such iterative training by analogy, until a target convergence condition is met, to obtain a first target voice conversion model and a second target voice conversion model. The first target voice conversion model and the second target voice conversion model may both be configured to convert input data corresponding to any timbre into voice data corresponding to target timbre.

The target convergence condition may be at least one of conditions such as that the loss information is less than a first preset threshold and a quantity of model iterations is greater than a first preset quantity of times. The loss information being less than the first preset threshold may be that the first loss and the second loss are both less than a corresponding preset loss threshold, or may be that a target loss obtained based on the first loss and the second loss is less than the corresponding first preset threshold.

It may be understood that, for a specific training process of the first initial voice conversion model and the second initial voice conversion model, refer to the content of the related embodiments of the foregoing method for training a voice conversion model, for example, the embodiment corresponding to FIG. 5. Details are not described herein again.

In the foregoing method for training a voice conversion model, a plurality of training voice feature pairs are acquired, and a target voice feature pair is determined from the training voice feature pairs, where a first training voice feature and a second training voice feature that belong to a same training voice feature pair correspond to voice content matching each other and correspond to different voice timbre; a first training voice feature in the target voice feature pair is inputted into a first initial voice conversion model to obtain first intermediate voice data and first predicted voice data, and a second training voice feature in the target voice feature pair is inputted into a second initial voice conversion model to obtain second intermediate voice data; the first predicted voice data is obtained based on the first intermediate voice data, voice data that corresponds to a target object identifier and whose voice content and voice content corresponding to the target voice feature pair match each other is used as target voice data, a first loss is generated based on a difference between the first intermediate voice data and the second intermediate voice data, and a second loss is generated based on a difference between the first predicted voice data and the target voice data, a model parameter of the first initial voice conversion model and a model parameter of the second initial voice conversion model are adjusted based on the first loss and the second loss to obtain a first intermediate voice conversion model and a second intermediate voice conversion model, the first intermediate voice conversion model is used as the first initial voice conversion model, the second intermediate voice conversion model is used as the second initial voice conversion model, a next training voice feature pair is used as the target voice feature pair, and the step of inputting a first training voice feature in the target voice feature pair into a first initial voice conversion model is performed again until a target convergence condition is met, to obtain a first target voice conversion model and a second target voice conversion model, where voice timbre corresponding to output data of the first target voice conversion model and the second target voice conversion model and voice timbre corresponding to the target object identifier match each other. In this way, through joint training between models, a first target voice conversion model and a second target voice conversion model with high voice conversion accuracy can be obtained through training. For a second loss adjustment model generated based on a difference between first predicted voice data and target voice data, output data of the model may be enabled to keep approaching an expected result, so that the trained model can convert input data into voice data with target timbre. For a first loss adjustment model generated based on a difference on first intermediate voice data and second intermediate voice data, the model may be enabled to make mapping positions of input data with matching content information and different timbre information to keep approaching in a feature space, so that the trained model can implement more stable voice conversion for input data with different timbre, thereby effectively improving voice conversion accuracy of the model. The first target voice conversion model and the second target voice conversion model that are obtained through model training based on a first loss and a second loss have high voice conversion accuracy.

In an embodiment, as shown in FIG. 8, a voice conversion method is provided. An example in which the method is applied to a computer device is used for description. It may be understood that, the computer device may be the terminal 102 in FIG. 1, or may be the server 104. The voice conversion method includes the following steps:

Step S802: Acquire a to-be-converted voice feature and a target object identifier.

The to-be-converted voice feature is a voice feature whose voice timbre needs to be converted. The to-be-converted voice feature may be a voice feature obtained by performing feature extraction on a voice sample. The voice sample corresponding to the to-be-converted voice feature may be a voice collected by a voice collection device in real time. For example, when sending a voice message, a user may select a target character to send a voice message with target timbre corresponding to the target character. A voice message that is recorded by the user in real time and has timbre of the user may be used as a to-be-converted voice message, voice timbre corresponding to the target character selected by the user is used as the target timbre, the to-be-converted voice message is converted in real time into a target voice message with the target timbre, and the target voice message is sent. The voice sample corresponding to the to-be-converted voice feature may be a voice recorded in advance. For example, original timbre corresponding to audio is converted into the target timbre.

The target object identifier is an object identifier corresponding to a target object. The target object is an object with the target timbre. The voice timbre corresponding to the to-be-converted voice feature needs to be converted into voice timbre corresponding to the target object. For example, the target character selected by the user may be used as the target object, and an object identifier corresponding to the target character is used as the target object identifier.

Specifically, the computer device may acquire the to-be-converted voice feature and the target object identifier locally or from another device, to further use a target voice conversion model corresponding to the target object identifier to convert the voice timbre corresponding to the to-be-converted voice feature into voice timbre corresponding to the target object identifier.

Step S804: Input the to-be-converted voice feature into a target voice conversion model corresponding to the target object identifier to obtain converted voice data, voice content corresponding to the converted voice data and voice content corresponding to the to-be-converted voice feature matching each other, voice timbre corresponding to the converted voice data and voice timbre corresponding to the target object identifier matching each other, the target voice conversion model being a first target voice conversion model or a second target voice conversion model.

The target voice conversion model is a first target voice conversion model or a second target voice conversion model. A training process of the first target voice conversion model and the second target voice conversion model including the following steps: acquiring a plurality of training voice feature pairs, and determining a target voice feature pair from the training voice feature pairs, where a first training voice feature and a second training voice feature that belong to a same training voice feature pair correspond to voice content matching each other and correspond to different voice timbre; inputting a first training voice feature in the target voice feature pair into a first initial voice conversion model to obtain first intermediate voice data and first predicted voice data, and inputting a second training voice feature in the target voice feature pair into a second initial voice conversion model to obtain second intermediate voice data, where the first predicted voice data is obtained based on the first intermediate voice data; using voice data that corresponds to the target object identifier and whose voice content and voice content corresponding to the target voice feature pair match each other as target voice data; generating a first loss based on a difference between the first intermediate voice data and the second intermediate voice data, and generating a second loss based on a difference between the first predicted voice data and the target voice data; adjusting a model parameter of the first initial voice conversion model and a model parameter of the second initial voice conversion model based on the first loss and the second loss to obtain a first intermediate voice conversion model and a second intermediate voice conversion model; and using the first intermediate voice conversion model as the first initial voice conversion model, using the second intermediate voice conversion model as the second initial voice conversion model, using a next training voice feature pair as the target voice feature pair, and returning to perform the step of inputting a first training voice feature in the target voice feature pair into a first initial voice conversion model until a target convergence condition is met, to obtain the first target voice conversion model and the second target voice conversion model.

It may be understood that, for a training process of the first target voice conversion model and the second target voice conversion model, refer to the content of the foregoing methods for training a voice conversion model. Details are not repeated herein.

The converted voice data is voice data with the voice timbre corresponding to the target object identifier. The converted voice data may be directly a voice, or may be spectral data of a voice, and the spectral data is subsequently converted into a voice. The voice timbre corresponding to the converted voice data and the voice timbre corresponding to the target object identifier match each other. The matching voice timbre may be completely consistent voice timbre or may be very similar voice timbre.

Specifically, the computer device may input the to-be-converted voice feature into the target voice conversion model corresponding to the target object identifier, and through data processing of the target voice conversion model, the target voice conversion model outputs the converted voice data. The target voice conversion model may convert voice timbre corresponding to input data into the voice timbre corresponding to the target object identifier on the basis of ensuring that a semantic of the input data is not changed. The voice content corresponding to the finally obtained converted voice data and the voice content corresponding to the to-be-converted voice feature match each other, and the voice timbre corresponding to the converted voice data and the voice timbre corresponding to the target object identifier match each other.

In an embodiment, the computer device may acquire a voice conversion task, the voice conversion task includes a to-be-converted voice and a target object identifier, a voice feature of the to-be-converted voice is extracted to obtain a to-be-converted voice feature, a target voice conversion model corresponding to the target object identifier is acquired, the to-be-converted voice feature is inputted into the target voice conversion model, and the target voice conversion model outputs converted voice data. The voice conversion task may be submitted by the user with the terminal.

In the foregoing voice conversion method, a to-be-converted voice feature and a target object identifier are acquired, and the to-be-converted voice feature is inputted into a target voice conversion model corresponding to the target object identifier to obtain converted voice data, voice content corresponding to the converted voice data and voice content corresponding to the to-be-converted voice feature matching each other, voice timbre corresponding to the converted voice data and voice timbre corresponding to the target object identifier matching each other, the target voice conversion model being a first target voice conversion model or a second target voice conversion model. A training process of the first target voice conversion model and the second target voice conversion model including the following steps: acquiring a plurality of training voice feature pairs, and determining a target voice feature pair from the training voice feature pairs, where a first training voice feature and a second training voice feature that belong to a same training voice feature pair correspond to voice content matching each other and correspond to different voice timbre; inputting a first training voice feature in the target voice feature pair into a first initial voice conversion model to obtain first intermediate voice data and first predicted voice data, and inputting a second training voice feature in the target voice feature pair into a second initial voice conversion model to obtain second intermediate voice data, where the first predicted voice data is obtained based on the first intermediate voice data; using voice data that corresponds to the target object identifier and whose voice content and voice content corresponding to the target voice feature pair match each other as target voice data; generating a first loss based on a difference between the first intermediate voice data and the second intermediate voice data, and generating a second loss based on a difference between the first predicted voice data and the target voice data; adjusting a model parameter of the first initial voice conversion model and a model parameter of the second initial voice conversion model based on the first loss and the second loss to obtain a first intermediate voice conversion model and a second intermediate voice conversion model; and using the first intermediate voice conversion model as the first initial voice conversion model, using the second intermediate voice conversion model as the second initial voice conversion model, using a next training voice feature pair as the target voice feature pair, and returning to perform the step of inputting a first training voice feature in the target voice feature pair into a first initial voice conversion model until a target convergence condition is met, to obtain the first target voice conversion model and the second target voice conversion model. In this way, through a first target voice conversion model or a second target voice conversion model, on the basis of keeping voice content corresponding to a current object identifier, voice timbre can be converted from timbre corresponding to the current object identifier into timbre corresponding to a target object identifier. The first target voice conversion model and the second target voice conversion model are obtained through joint training and have high voice conversion accuracy, so that more accurate voice conversion can be implemented by using the first target voice conversion model or the second target voice conversion model, to obtain relatively accurate converted voice data. The first target voice conversion model and the second target voice conversion model are obtained through training based on a first loss and a second loss. For a second loss adjustment model generated based on a difference between first predicted voice data and target voice data, output data of the model may be enabled to keep approaching an expected result, so that the trained model can convert input data into voice data with target timbre. For a first loss adjustment model generated based on a difference on first intermediate voice data and second intermediate voice data, the model may be enabled to make mapping positions of input data with matching content information and different timbre information to keep approaching in a feature space, so that the trained model can implement more stable voice conversion for input data with different timbre, thereby effectively improving voice conversion accuracy of the model.

In a specific embodiment, referring to FIG. 9, a pseudo-sample is synthesized based on an existing non-parallel data set, and timbre augmentation is performed. The timbre-augmented parallel data set is used to train a voice conversion model (the voice conversion model may also be referred to as a VC model) unrelated to a speaker.

1. A pseudo-sample is synthesized based on an existing non-parallel data set, and timbre augmentation is performed on the pseudo-sample to obtain a timbre-augmented data set.
1-1. Train a pseudo-sample synthesis model
1-2. Synthesize a parallel pseudo-sample dataset
1-3. Extract a PPG feature of a pseudo-sample
1-4. Sample an aligned PPG feature
1-5. Perform random value assignment and summation on sampled PPG features
1-6. Generate a timbre augmentation data set
2. Complete training of a speaker-unrelated voice conversion model by using the timbre-augmented data set.

Figure 10:
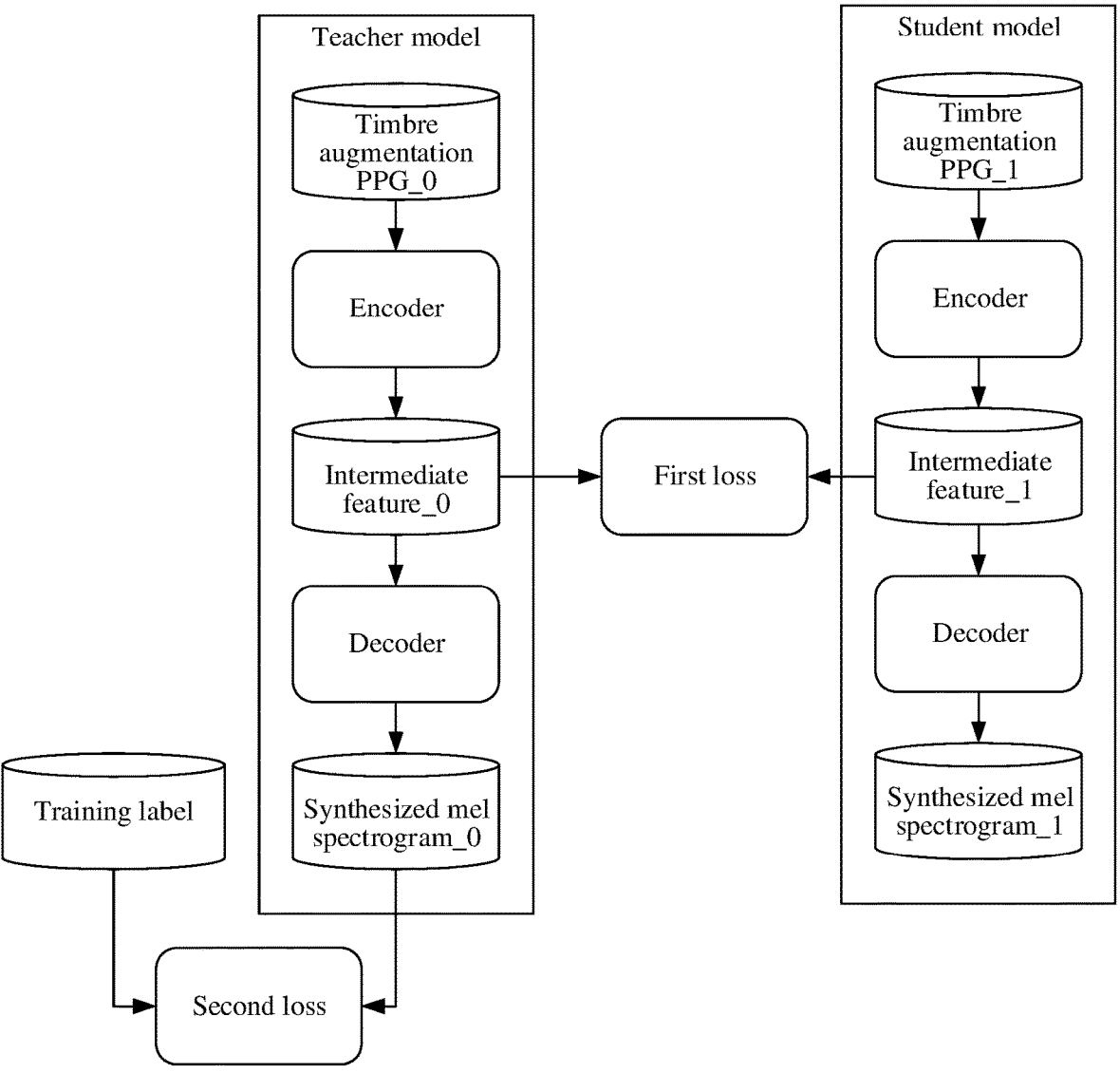
FIG. 10 is a schematic flowchart of training a teacher model and a student model according to an embodiment of the present disclosure.

FIG. 10 shows a training process of training a voice conversion model based on a timbre augmentation data set.

Training data: In each time of training, an input feature of a model is a pair of PPG features. The two PPG features are generated by using a timbre augmentation method and have same voice content information. A training label (which may also be referred to as a ground truth, real data) configured for supervision is a Mel spectrogram calculated according to a voice of a target speaker, and voice content information corresponding to the Mel spectrogram is the same as that of two PPG features. A training objective is to enable the model to output, according to an inputted PPG with random timbre, a Mel spectrogram that has the same voice content as the inputted PPG but has timbre of the target speaker. The Mel spectrogram is an acoustic feature, reflecting spectral information of a voice.

Model structure: In the aspect of a model structure, an encoder-decoder architecture is used. The encoder can extract useful information in an input feature according to a task requirement, and map the input feature into a more abstract semantic space to obtain an intermediate feature, and subsequently the decoder parses the intermediate feature to complete reconstruction of the Mel spectrogram. A teacher model and a student model are further disposed, and have identical model structures and parameter dimensions.

Training procedure: For two PPG feature inputs that have same voice content information and different timbre information, it is expected that outputs of the two in a feature space of the encoder can have a small difference. In other words, in this case, the encoder can ignore different timbre information between PPGs, that is, can extract a speaker-unrelated feature.

2-1. Two PPGs (that is, "timbre augmentation PPG_0" and "timbre augmentation PPG_1" in FIG. 10) that have the same voice content information and different timbre information are respectively inputted into the teacher model and the student model.

2-2. A second loss (also referred to as a synthesis error or a synthesis loss) is calculated according to a final output result (that is, a "synthesized Mel spectrogram_0" in FIG. 10) of the teacher model and the ground truth (that is, the training label in FIG. 10). The loss function used herein is a mean square error. A calculation formula of the second loss is as follows:

$$L_m = MSE(y_t, y_{gt}),$$

where y denotes the final output result of the teacher model, and $y_{gt}$ denotes the training label. The MSE denotes the calculated mean square error.

2-3. A first loss (also referred to as a consistency error or a consistency loss) is calculated according to bottleneck layer features (that is, "intermediate feature_0" and "intermediate feature_1" in FIG. 10) of the teacher model and the student model. The loss function used herein is a mean square error. A calculation formula of the first loss is as follows:

$$L_c = MSE(y_{ct}, y_{cs}),$$

where $y_{ct}$ denotes an intermediate layer feature (which may also be referred to as a bottleneck layer feature) of the teacher model, and $y_{cs}$ denotes an intermediate layer feature of the student model.

2-4. A total loss L is calculated based on the first loss and the second loss:

$$L = L_m + \gamma L_c,$$

where γ increases as a quantity of rounds of training increases.

2-5. A parameter of the teacher model is updated according to the total loss L and by using back propagation.

2-6. A model parameter of the student model is updated according to a moving average of the teacher model.

First, the parameter of the teacher model is updated based on the total loss L, and then the model parameter of the student model is updated based on the updated model parameter of the teacher model. Weighted summation may be performed on the updated model parameter of the teacher model and the model parameter of the student model to obtain the updated model parameter of the student model.

In the foregoing training manner, a PPG pair is inputted, and a consistency loss between intermediate layers of the teacher model and the student model is added, so that the model can map the PPGs with close voice content to a position at a short distance, ignore timbre interference between the PPGs, and have better robustness for different timbre inputs. In addition, the parameter of the student model is the moving average of the teacher model. This enables the student model is subjected to small interference for samples with large noise in a data set, so that supervision can be stably provided for the teacher model in the feature space outputted by the encoder. In addition, the moving average can further produce an effect similar to that of integrated learning, so that the model can have better generalization ability.

In this embodiment, a large number of voice features that have the same content information and different timbre information are generated by using the timbre augmentation method. In addition, through this timbre augmentation method, a data set includes more timbre classes at low costs, so that a risk of overfitting generated due to a small number of timbre classes in model training is reduced. A feature distribution in a feature space of a bottleneck layer is constrained by using a speaker-unrelated training architecture and through a consistency loss, so that samples that have close voice content information are mapped to a nearby position. In addition, an input of the model in the training process is PPG features that have different timbre and same content, so that the model can have better robustness against interference caused by timbre information in the inputted PPG features, that is, can better extract a speaker-unrelated feature.

In a specific embodiment, the method for training a voice conversion model or voice conversion method in the present disclosure may be applied to various voice conversion scenarios. For example, in instant voice and video communication, a user may specify target timbre, for example, a game character A. Through the method in the present disclosure, a voice input of a voice sender may be converted into a voice with the target timbre, and a voice received by a voice receiver is the voice with the target timbre. When a voice message is sent in an application program, a voice message of a user may also be converted into a voice message with the target timbre through the method in the present disclosure for sending.

It is to be understood that, although the steps are displayed sequentially according to the instructions of the arrows in the flowcharts of the above embodiments, these steps are not necessarily performed sequentially according to the sequence instructed by the arrows. Unless otherwise clearly specified in this specification, the steps are performed without any strict sequence limit, and may be performed in other orders. Besides, at least some steps in the flowchart in the above embodiments may include a plurality of steps or a plurality of stages, the steps or stages are not necessarily performed at a same moment and may be performed at different moments, the steps or stages are not necessarily sequentially performed, and the steps or stages and at least some of other steps or steps or stages of other steps may be performed in turn or alternately.

Based on the same inventive concept, the embodiments of the present disclosure further provide an apparatus for training a voice conversion model configured to implement the foregoing related method for training a voice conversion model and a voice conversion apparatus configured to implement the foregoing related voice conversion method. An implementation solution for solving the problem provided in the apparatus is similar to an implementation solution recorded in the foregoing method. Therefore, for specific limitations in one or more embodiments of the apparatus for training a voice conversion model provided below, refer to the above limitations for the method for training a voice conversion model. For specific limitations in one or more embodiments of the voice conversion apparatus provided below, refer to the above limitations for the voice conversion method. Details are not described herein again.

Figure 11:
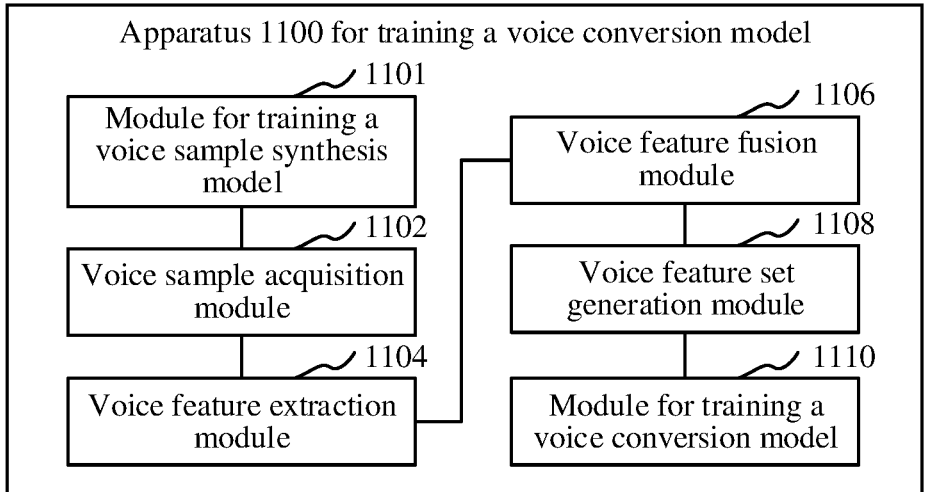
FIG. 11 is a structural block diagram of an apparatus for training a voice conversion model according to an embodiment of the present disclosure.

According to an embodiment of the present disclosure, as shown in FIG. 11, an apparatus 1100 for training a voice conversion model is provided, and includes a voice sample acquisition module 1102, a voice feature extraction module 1104, a voice feature fusion module 1106, a voice feature set generation module 1108, and a module 1110 for training a voice conversion model.

The voice sample acquisition module 1102 is configured to acquire a voice sample set, the voice sample set including a plurality of training voice samples that respectively correspond to a plurality of training object identifiers, each of the plurality of training voice samples corresponding to one of a plurality of pieces of voice content, at least one training voice sample in the voice sample set being a synthesized voice sample, the synthesized voice sample being obtained by performing voice sample synthesis on a preset voice content feature and a voice timbre feature corresponding to a training object identifier.

The voice feature extraction module 1104 is configured to extract voice features of the training voice samples to obtain initial voice features that respectively correspond to the training voice samples.

The voice feature fusion module 1106 is configured to fuse initial voice features that belong to different training object identifiers and have corresponding voice content matching each other to obtain target voice features.

The voice feature set generation module 1108 is configured to obtain a voice feature set based on the target voice features.

The module 1110 for training a voice conversion model is configured to: input a voice feature in the voice feature set into an initial voice conversion model to obtain predicted voice data, and adjust a model parameter of the initial voice conversion model based on a difference between the predicted voice data and target voice data corresponding to a target object identifier until a first convergence condition is met, to obtain a target voice conversion model, voice content corresponding to the predicted voice data and the target voice data matching each other, voice timbre corresponding to output data of the target voice conversion model and voice timbre corresponding to the target object identifier matching each other.

For the foregoing apparatus for training a voice conversion model, initial voice features that belong to different training object identifiers and have corresponding voice content matching each other are fused to obtain target voice features, so that timbre augmentation can be implemented, to obtain a target voice feature whose voice content matches the initial voice features and has new timbre. In addition, the initial voice features include a voice feature extracted from a synthesized voice sample. The synthesized voice sample is a pseudo-sample. The pseudo-sample is not a real voice sample. The pseudo-sample helps to reduce collection pressure of voice samples, increase a data amount of voice samples, and increase a data amount of initial voice features, so that target voice features corresponding to various timbre can be obtained through timbre augmentation. A voice feature set formed by voice features corresponding to various timbre is used as a training set for a voice conversion model, so that training quality of the voice conversion model can be effectively improved. The model is enabled to learn conversion between different timbre, to reduce a risk of overfitting of specific timbre by the model, thereby effectively improving voice conversion accuracy of the voice conversion model.

In an embodiment, the synthesized voice sample is obtained by inputting a preset voice content feature and a voice timbre feature corresponding to a training object identifier into a target voice sample synthesis model. As shown in FIG. 11, the apparatus 1100 for training a voice conversion model further includes:

a module 1101 for training a voice sample synthesis model, configured to: acquire original voice samples and voice timbre features corresponding to a plurality of candidate object identifiers, and determine a reference object identifier from the plurality of candidate object identifiers; acquire a voice content feature matching voice content of an original voice sample corresponding to the reference object identifier as a reference voice content feature; input a voice timbre feature and the reference voice content feature that correspond to the reference object identifier into an initial voice sample synthesis model to obtain a predicted voice sample corresponding to the reference object identifier; adjust a model parameter of the initial voice sample synthesis model based on the original voice sample and the predicted voice sample that correspond to the reference object identifier to obtain an intermediate voice sample synthesis model; and use a next candidate object identifier as the reference object identifier, use the intermediate voice sample synthesis model as the initial voice sample synthesis model, and return to perform the step of acquiring a voice content feature matching voice content of an original voice sample corresponding to the reference object identifier as a reference voice content feature until a second convergence condition is met, to obtain the target voice sample synthesis model.

In an embodiment, the voice feature fusion module 1106 is further configured to:

acquire an initial voice feature corresponding to a first training object identifier as a first initial voice feature, and acquire an initial voice feature corresponding to a second training object identifier as a second initial voice feature, voice content corresponding to the first initial voice feature and the second initial voice feature matching each other; acquire a first weight corresponding to the first initial voice feature and a second weight corresponding to the second initial voice feature, where a sum of the first weight and the second weight is 1; and perform weighted fusion on the first initial voice feature and the second initial voice feature based on the first weight and the second weight to obtain a target voice feature.

In an embodiment, each of the first initial voice feature and the second initial voice feature includes voice sub-features that respectively correspond to sequentially arranged voice frames of a target quantity. The voice feature fusion module 1106 is further configured to:

perform weighted fusion on voice sub-features corresponding to voice frames of a same sequence number based on the first weight and the second weight in the first initial voice feature and the second initial voice feature, to obtain sequentially arranged target sub-features of the target quantity, where voice content corresponding to the voice sub-features corresponding to the voice frames of the same sequence number matches each other; and obtain the target voice feature based on the sequentially arranged target sub-features of the target quantity.

In an embodiment, the voice feature set generation module 1108 is further configured to:

obtain the voice feature set based on the initial voice features and the target voice features.

In an embodiment, the module 1110 for training a voice conversion model includes:

a training data acquisition unit, configured to: determine a plurality of training voice feature pairs from the voice feature set, and determine a target voice feature pair from the training voice feature pairs, where a first training voice feature and a second training voice feature that belong to a same training voice feature pair correspond to voice content matching each other and correspond to different voice timbre;

a training data input unit, configured to: input a first training voice feature in the target voice feature pair into a first initial voice conversion model to obtain first intermediate voice data and first predicted voice data, and input a second training voice feature in the target voice feature pair into a second initial voice conversion model to obtain second intermediate voice data, where the first predicted voice data is obtained based on the first intermediate voice data;

a training label acquisition unit, configured to use voice data that corresponds to a target object identifier and whose voice content and voice content corresponding to the target voice feature pair match each other as target voice data;

a loss generation unit, configured to: generate a first loss based on a difference between the first intermediate voice data and the second intermediate voice data, and generate a second loss based on a difference between the first predicted voice data and the target voice data;

a model parameter adjustment unit, configured to adjust a model parameter of the first initial voice conversion model and a model parameter of the second initial voice conversion model based on the first loss and the second loss to obtain a first intermediate voice conversion model and a second intermediate voice conversion model; and an iterative training unit, configured to: use the first intermediate voice conversion model as the first initial voice conversion model, use the second intermediate voice conversion model as the second initial voice conversion model, use a next training voice feature pair as the target voice feature pair, and return to perform the step of inputting a first training voice feature in the target voice feature pair into a first initial voice conversion model until a first convergence condition is met, to obtain a first target voice conversion model and a second target voice conversion model.

In an embodiment, the training data input unit is further configured to:

input the first training voice feature in the target voice feature pair into an encoder in the first initial voice conversion model to obtain the first intermediate voice data; input the first intermediate voice data into a decoder in the first initial voice conversion model to obtain the first predicted voice data; and input the second training voice feature in the target voice feature pair into an encoder in the second initial voice conversion model to obtain the second intermediate voice data.

In an embodiment, the model parameter adjustment unit is further configured to:

generate a target loss based on the first loss and the second loss; adjust the model parameter of the first initial voice conversion model based on the target loss to obtain the first intermediate voice conversion model; and adjust a model parameter corresponding to the second initial voice conversion model based on a model parameter of the first intermediate voice conversion model to obtain the second intermediate voice conversion model.

In an embodiment, the model parameter adjustment unit is further configured to:

acquire a loss weight corresponding to the first loss; adjust the first loss based on the loss weight to obtain an updated loss; and obtain the target loss based on the second loss and the updated loss.

In an embodiment, the loss weight corresponding to the first loss increases as a quantity of rounds of model training increases.

In an embodiment, when a current round number of model training is less than or equal to a preset quantity of rounds, the loss weight corresponding to the first loss remains unchanged; and when the current round number of model training is greater than the preset quantity of rounds, the loss weight corresponding to the first loss increases as a quantity of rounds of model training increases.

In an embodiment, model parameters having a matching relationship exist between the first intermediate voice conversion model and the second initial voice conversion model. The model parameter adjustment unit is further configured to:

use the model parameters having a matching relationship that exist in the first intermediate voice conversion model and the second initial voice conversion model as a first model parameter and a second model parameter respectively; fuse the first model parameter and the second model parameter having a matching relationship that exist to obtain a target model parameter; and replace the corresponding model parameter in the second initial voice conversion model based on the target model parameter to obtain the second intermediate voice conversion model.

Figure 12:
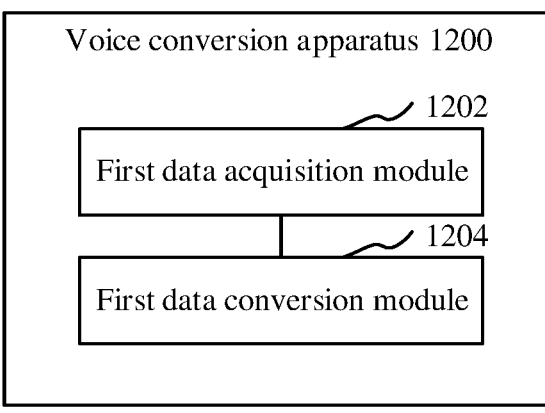
FIG. 12 is a structural block diagram of a voice conversion apparatus according to an embodiment of the present disclosure.

In an embodiment, as shown in FIG. 12, a voice conversion apparatus 1200 is provided, and includes a first data acquisition module 1202 and a first data conversion module 1204.

The first data acquisition module 1202 is configured to acquire a to-be-converted voice feature and a target object identifier.

The first data conversion module 1204 is configured to input the to-be-converted voice feature into a target voice conversion model corresponding to the target object identifier to obtain converted voice data, voice content corresponding to the converted voice data and voice content corresponding to the to-be-converted voice feature matching each other, voice timbre corresponding to the converted voice data and voice timbre corresponding to the target object identifier matching each other.

A training process of the target voice conversion model including the following steps: acquiring a voice sample set, the voice sample set including a plurality of training voice samples that respectively correspond to a plurality of training object identifiers, each of the plurality of training voice samples corresponding to one of a plurality of pieces of voice content, at least one training voice sample in the voice sample set being a synthesized voice sample, the synthesized voice sample being obtained by performing voice sample synthesis on a preset voice content feature and a voice timbre feature corresponding to a training object identifier; extracting voice features of the training voice samples to obtain initial voice features that respectively correspond to the training voice samples; fusing initial voice features that belong to different training object identifiers and have corresponding voice content matching each other to obtain target voice features; obtaining a voice feature set based on the target voice features; and inputting a voice feature in the voice feature set into an initial voice conversion model to obtain predicted voice data, and adjusting a model parameter of the initial voice conversion model based on a difference between the predicted voice data and target voice data corresponding to the target object identifier until a first convergence condition is met, to obtain the target voice conversion model, voice content corresponding to the predicted voice data and the target voice data matching each other.

For the foregoing voice conversion apparatus, through a target voice conversion model, on the basis of keeping voice content corresponding to a current object identifier, voice timbre can be converted from timbre corresponding to the current object identifier into timbre corresponding to a target object identifier. A training set for the target voice conversion model is generated based on a synthesized voice sample and through timbre augmentation. The trained target voice conversion model has better voice conversion accuracy, so that more accurate voice conversion can be implemented by using the target voice conversion model, to obtain relatively accurate converted voice data. For the target voice conversion model, initial voice features that belong to different training object identifiers and have corresponding voice content matching each other are fused to obtain target voice features, so that timbre augmentation can be implemented, to obtain a target voice feature whose voice content matches the initial voice features and has new timbre. In addition, the initial voice features include a voice feature extracted from a synthesized voice sample. The synthesized voice sample is a pseudo-sample. The pseudo-sample is not a real voice sample. The pseudo-sample helps to reduce collection pressure of voice samples, increase a data amount of voice samples, and increase a data amount of initial voice features, so that target voice features corresponding to various timbre can be obtained through timbre augmentation. A voice feature set formed by voice features corresponding to various timbre is used as a training set for a voice conversion model, so that training quality of the voice conversion model can be effectively improved. The model is enabled to learn conversion between different timbre, to reduce a risk of overfitting of specific timbre by the model, thereby effectively improving voice conversion accuracy of the voice conversion model.

Figure 13:
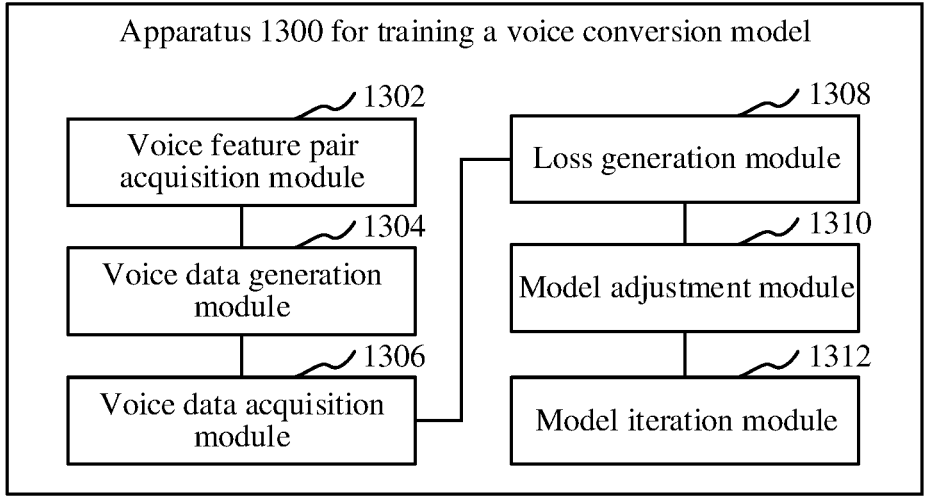
FIG. 13 is a structural block diagram of an apparatus for training a voice conversion model in another embodiment.

In an embodiment, as shown in FIG. 13, an apparatus 1300 for training a voice conversion model is provided, and includes a voice feature pair acquisition module 1302, a voice data generation module 1304, a voice data acquisition module 1306, a loss generation module 1308, a model adjustment module 1310, and a model iteration module 1312.

The voice feature pair acquisition module 1302 is configured to: acquire a plurality of training voice feature pairs, and determine a target voice feature pair from the training voice feature pairs, a first training voice feature and a second training voice feature that belong to a same training voice feature pair corresponding to voice contingent matching each other and corresponding to different voice timbre.

The voice data generation module 1304 is configured to: input a first training voice feature in the target voice feature pair into a first initial voice conversion model to obtain first intermediate voice data and first predicted voice data, and input a second training voice feature in the target voice feature pair into a second initial voice conversion model to obtain second intermediate voice data, the first predicted voice data being obtained based on the first intermediate voice data.

The voice data acquisition module 1306 is configured to use voice data that corresponds to a target object identifier and whose voice content and voice content corresponding to the target voice feature pair match each other as target voice data.

The loss generation module 1308 is configured to: generate a first loss based on a difference between the first intermediate voice data and the second intermediate voice data, and generate a second loss based on a difference between the first predicted voice data and the target voice data.

The model adjustment module 1301 is configured to adjust a model parameter of the first initial voice conversion model and a model parameter of the second initial voice conversion model based on the first loss and the second loss to obtain a first intermediate voice conversion model and a second intermediate voice conversion model.

The model iteration module 1312 is configured to: use the first intermediate voice conversion model as the first initial voice conversion model, use the second intermediate voice conversion model as the second initial voice conversion model, use a next training voice feature pair as the target voice feature pair, and return to perform the step of inputting a first training voice feature in the target voice feature pair into a first initial voice conversion model until a target convergence condition is met, to obtain a first target voice conversion model and a second target voice conversion model, voice timbre corresponding to output data of the first target voice conversion model and the second target voice conversion model and voice timbre corresponding to the target object identifier matching each other.

For the foregoing apparatus for training a voice conversion model, through joint training between models, a first target voice conversion model and a second target voice conversion model with high voice conversion accuracy can be obtained through training. For a second loss adjustment model generated based on a difference between first predicted voice data and target voice data, output data of the model may be enabled to keep approaching an expected result, so that the trained model can convert input data into voice data with target timbre. For a first loss adjustment model generated based on a difference on first intermediate voice data and second intermediate voice data, the model may be enabled to make mapping positions of input data with matching content information and different timbre information to keep approaching in a feature space, so that the trained model can implement more stable voice conversion for input data with different timbre, thereby effectively improving voice conversion accuracy of the model. The first target voice conversion model and the second target voice conversion model that are obtained through model training based on a first loss and a second loss have high voice conversion accuracy.

Figure 14:
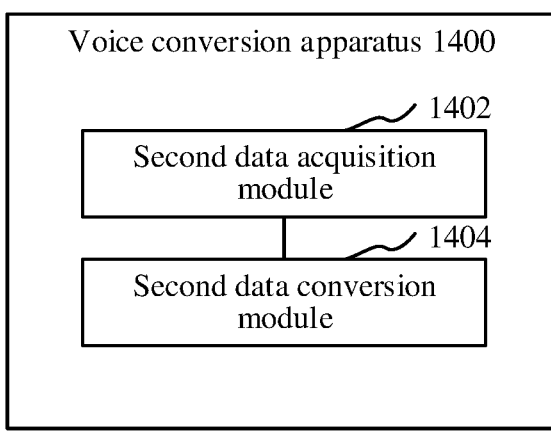
FIG. 14 is a structural block diagram of a voice conversion apparatus in another embodiment.

In an embodiment, as shown in FIG. 14, a voice conversion apparatus 1400 is provided, and includes a second data acquisition module 1402 and a second data conversion module 1404.

The second data acquisition module 1402 is configured to acquire a to-be-converted voice feature and a target object identifier.

The second data conversion module 1404 is configured to input the to-be-converted voice feature into a target voice conversion model corresponding to the target object identifier to obtain converted voice data, voice content corresponding to the converted voice data and voice content corresponding to the to-be-converted voice feature matching each other, voice timbre corresponding to the converted voice data and voice timbre corresponding to the target object identifier matching each other, the target voice conversion model being a first target voice conversion model or a second target voice conversion model.

A training process of the first target voice conversion model and the second target voice conversion model including the following steps: acquiring a plurality of training voice feature pairs, and determining a target voice feature pair from the training voice feature pairs, where a first training voice feature and a second training voice feature that belong to a same training voice feature pair correspond to voice content matching each other and correspond to different voice timbre; inputting a first training voice feature in the target voice feature pair into a first initial voice conversion model to obtain first intermediate voice data and first predicted voice data, and inputting a second training voice feature in the target voice feature pair into a second initial voice conversion model to obtain second intermediate voice data, where the first predicted voice data is obtained based on the first intermediate voice data; using voice data that corresponds to the target object identifier and whose voice content and voice content corresponding to the target voice feature pair match each other as target voice data; generating a first loss based on a difference between the first intermediate voice data and the second intermediate voice data, and generating a second loss based on a difference between the first predicted voice data and the target voice data; adjusting a model parameter of the first initial voice conversion model and a model parameter of the second initial voice conversion model based on the first loss and the second loss to obtain a first intermediate voice conversion model and a second intermediate voice conversion model; and using the first intermediate voice conversion model as the first initial voice conversion model, using the second intermediate voice conversion model as the second initial voice conversion model, using a next training voice feature pair as the target voice feature pair, and returning to perform the step of inputting a first training voice feature in the target voice feature pair into a first initial voice conversion model until a target convergence condition is met, to obtain the first target voice conversion model and the second target voice conversion model.

For the foregoing voice conversion apparatus, through a first target voice conversion model or a second target voice conversion model, on the basis of keeping voice content corresponding to a current object identifier, voice timbre can be converted from timbre corresponding to the current object identifier into timbre corresponding to a target object identifier. The first target voice conversion model and the second target voice conversion model are obtained through joint training and have high voice conversion accuracy, so that more accurate voice conversion can be implemented by using the first target voice conversion model or the second target voice conversion model, to obtain relatively accurate converted voice data. The first target voice conversion model and the second target voice conversion model are obtained through training based on a first loss and a second loss. For a second loss adjustment model generated based on a difference between first predicted voice data and target voice data, output data of the model may be enabled to keep approaching an expected result, so that the trained model can convert input data into voice data with target timbre. For a first loss adjustment model generated based on a difference on first intermediate voice data and second intermediate voice data, the model may be enabled to make mapping positions of input data with matching content information and different timbre information to keep approaching in a feature space, so that the trained model can implement more stable voice conversion for input data with different timbre, thereby effectively improving voice conversion accuracy of the model.

The modules in the foregoing apparatus for training a voice conversion model and voice conversion apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a server, and an internal structure diagram thereof may be shown in FIG. 15. The computer device includes a processor, a memory, an input/output (I/O) interface, and a communication interface. The processor, the memory, and the input/output interface are connected by a system bus. The communication interface is connected to the system bus by the input/output interface. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. The database of the computer device is configured to store data such as a voice sample set and a voice feature set. The input/output interface of the computer device is configured to exchange information between the processor and an external device. The communication interface of the computer device is configured to communicate with an external terminal through a network connection. When executed by a processor, the computer-readable instructions implement the foregoing method for training a voice conversion model or voice conversion method.

In an embodiment, a computer device is provided. The computer device may be a terminal, and an internal structure diagram thereof may be shown in FIG. 16. The computer device includes a processor, a memory, an input/output interface, a communication interface, a display unit, and an input apparatus. The processor, the memory, and the input/output interface are connected by a system bus. The communication interface, the display unit, and the input appa-ratus are connected to the system bus by the input/output interface. The processor of the computer device is config-ured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instructions in the non-volatile storage medium. The input/output interface of the computer device is configured to exchange information between the processor and an external device. The communication interface of the computer device is configured to communicate with an external terminal in a wired or wireless mode. The wireless mode may be implemented through Wi-Fi, a mobile cellular network, near field communication (NFC), or another tech-nology. When executed by a processor, the computer-read-able instructions implement the foregoing method for train-ing a voice conversion model or voice conversion method. The display unit of the computer device is configured to form a visible picture, and may be a display screen, a projection apparatus or a virtual reality imaging apparatus. The display screen may be a liquid crystal display screen or an e-ink display screen. The input apparatus of the computer device may be a touch layer covering the display screen, or a button, a trackball, or a touchpad disposed on a housing of the computer device, or an external keyboard, touchpad, mouse, or the like.

Figure 15:
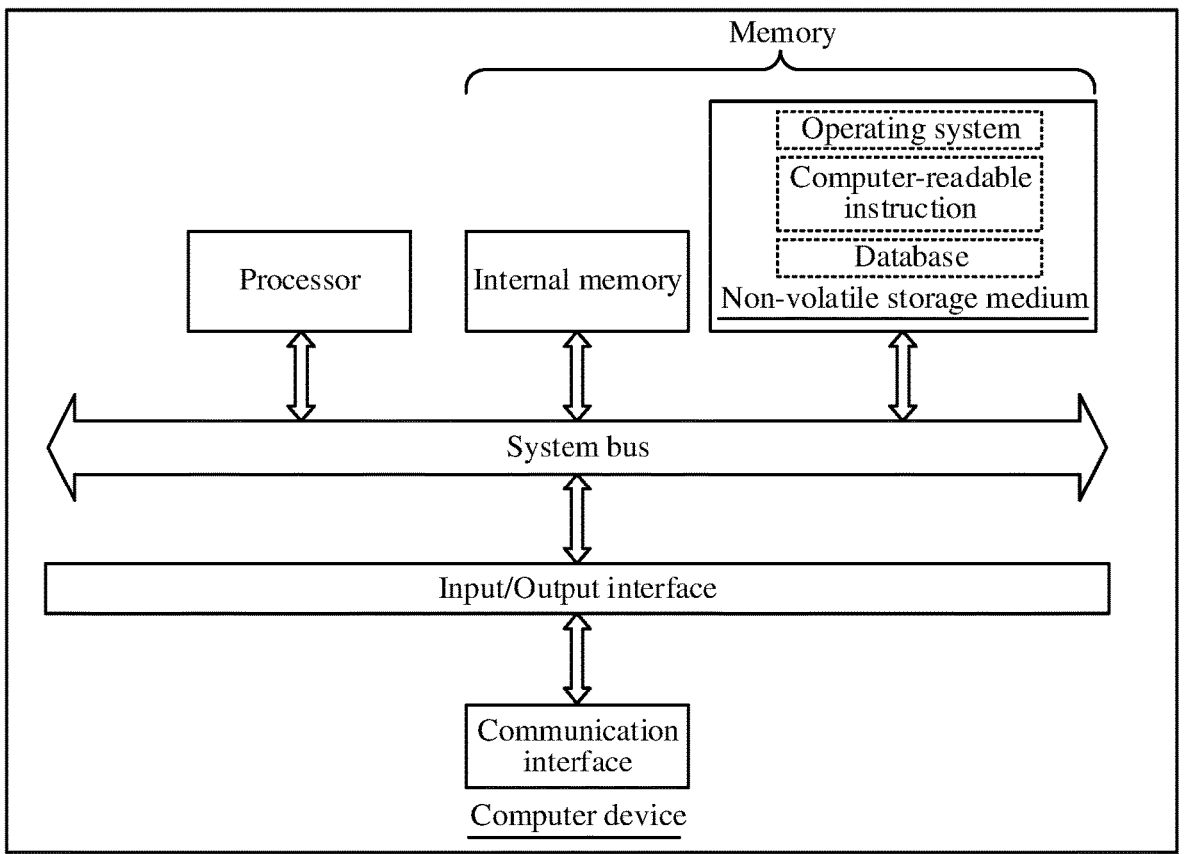
FIG. 15 is a diagram of an internal structure of a computer device according to an embodiment of the present disclosure.
Figure 16:
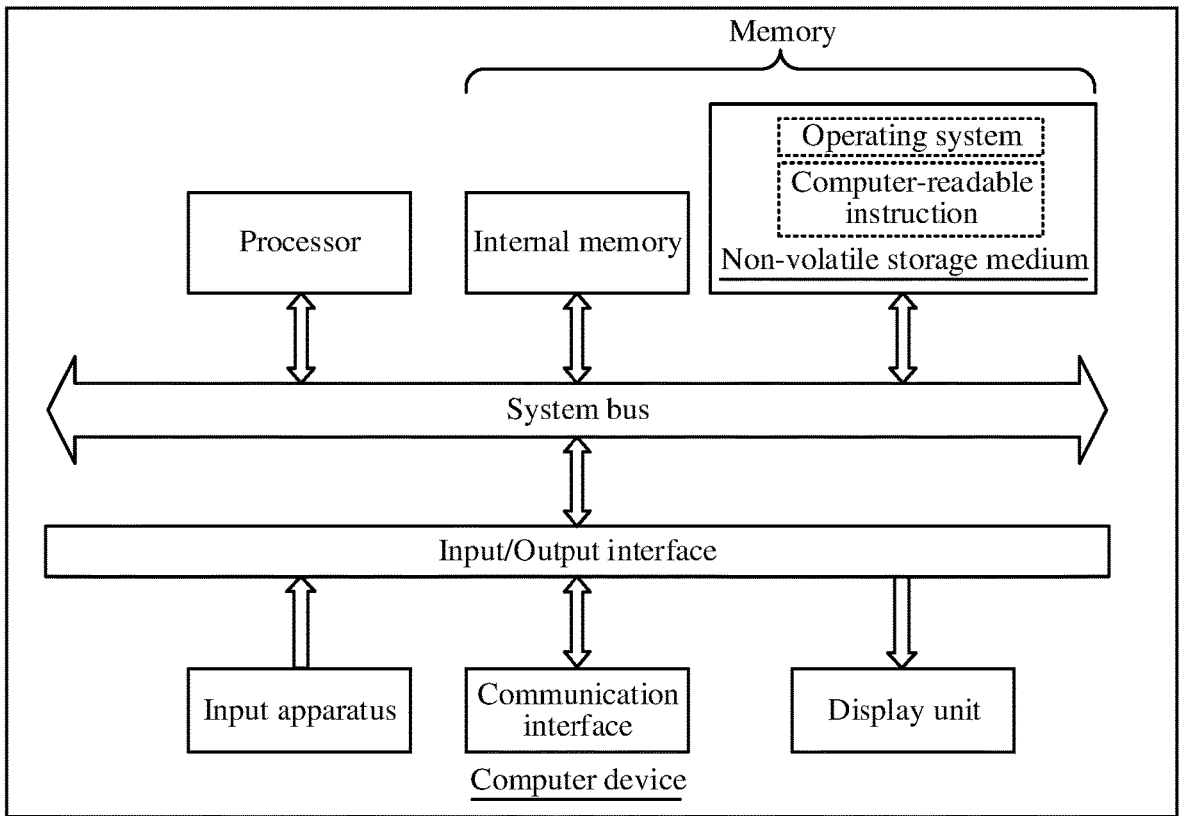
FIG. 16 is a diagram of an internal structure of a computer device in another embodiment.

Persons skilled in the art may understand that the struc-tures shown in the block diagram of FIG. 15 and FIG. 16 are only a partial structure related to a solution in the present disclosure, and the figures do not constitute a limitation to the computer device to which the solution in the present disclosure is applied. Specifically, the computer device may include more components or fewer components than those shown in the figures, or some components may be com-bined, or a different component deployment may be used.

In an embodiment, a computer device is further provided, and includes a memory and a processor, the memory storing computer-readable instructions, when executed by the pro-cessor, the computer-readable instructions implementing the steps in the foregoing method embodiments.

In an embodiment, a computer-readable storage medium is further provided, storing computer-readable instructions, when executed by a processor, the computer-readable instructions implementing the steps in the foregoing method embodiments.

In an embodiment, a computer program product or a computer program is further provided, the computer pro-gram product or the computer program including computer-readable instructions, the computer-readable instructions being stored in a computer-readable storage medium. A processor of a computer device reads the computer-readable instructions from the computer-readable storage medium, and the processor performs the computer-readable instruc-tions, to cause the computer device to perform the steps in the foregoing method embodiments.

User information (including, but not limited to, device information of a user, and personal information of a user) and data (including, but not limited to, data for analysis, stored data, and displayed data) in the present disclosure are all information and data authorized by a user or fully authorized by all parties, and the collection, use and pro-cessing of relevant data need to comply with the relevant laws, regulations, and standards of the relevant countries and regions.

Persons of ordinary skill in the art may understand that all or some of the processes of the methods in the foregoing embodiments may be implemented by computer-readable instructions instructing relevant hardware. The computer-readable instructions may be stored in a non-volatile computer-readable storage medium. When the computer-readable instructions run, the procedures of the foregoing method embodiments are performed. References to the memory, the database, or other medium used in the embodiments provided in the present disclosure may all include at least one of a non-volatile and a volatile memory. The non-volatile memory may include a read-only memory (ROM), a magnetic tape, a floppy disk, a flash, an optical memory, a high-density embedded non-volatile memory, a rheostat memory (ReRAM), a magnetoresistive random access memory (MRAM), a ferroelectric random access memory (FRAM), a phase change memory (PCM), a graphene memory, or the like. The volatile memory may include a random access memory (RAM) or a cache. By way of description rather than limitation, the RAM may be obtained in a plurality of forms, for example, a static random access memory (SRAM) or a dynamic random access memory (DRAM). The database in the embodiments provided in the present disclosure may include at least one of a relational database and a non-relational database. The non-relational database may include a blockchain-based distributed database, or the like, but is not limited thereto. The processor in the embodiments provided in the present disclosure may be a general-purpose processor, a central processing unit, a graphic processing unit, a digital signal processor, a programmable logic device, a quantum computation-based data processing logic device, or the like, but is not limited thereto.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only show several implementations of the present disclosure and are described in detail, but they are not to be construed as a limit to the patent scope of the present disclosure. Persons of ordinary skill in the art may make various changes and improvements without departing from the ideas of the present disclosure, which shall all fall within the protection scope of the present disclosure. Therefore, the protection scope of the present disclosure shall be subject to the appended claims.

What is claimed is:

1. A method for training a voice conversion model, performed by a computer device, the method comprising:

acquiring a voice sample set, the voice sample set comprising a plurality of training voice samples that respectively correspond to a plurality of training object identifiers, one of the plurality of training voice samples corresponding to one of a plurality of pieces of voice content, at least one training voice sample in the voice sample set being a synthesized voice sample, the synthesized voice sample being obtained by performing voice sample synthesis on a preset voice content feature and a voice timbre feature corresponding to a training object identifier;

extracting voice features of the training voice samples to obtain initial voice features that respectively correspond to the training voice samples;

fusing initial voice features that belong to different training object identifiers and have corresponding voice content matching each other to obtain target voice features;

obtaining a voice feature set based on the target voice features; and inputting a voice feature in the voice feature set into an initial voice conversion model to obtain predicted voice data, and adjusting a model parameter of the initial voice conversion model based on a difference between the predicted voice data and target voice data corresponding to a target object identifier until a first convergence condition is met, to obtain a target voice conversion model, input data of the initial voice conversion model and voice content corresponding to the target voice data matching each other, voice timbre corresponding to output data of the target voice conversion model and voice timbre corresponding to the target object identifier matching each other.

2. The method according to claim 1, wherein the synthesized voice sample is obtained by inputting the preset voice content feature and the voice timbre feature corresponding to the training object identifier into a target voice sample synthesis model, and a training process of the target voice sample synthesis model comprises following operations:

acquiring original voice samples and voice timbre features corresponding to a plurality of candidate object identifiers, and determining a reference object identifier from the plurality of candidate object identifiers;

acquiring a voice content feature matching voice content of an original voice sample corresponding to the reference object identifier as a reference voice content feature;

inputting a voice timbre feature and the reference voice content feature that correspond to the reference object identifier into an initial voice sample synthesis model to obtain a predicted voice sample corresponding to the reference object identifier;

adjusting a model parameter of the initial voice sample synthesis model based on the original voice sample and the predicted voice sample that correspond to the reference object identifier to obtain an intermediate voice sample synthesis model; and using a next candidate object identifier as the reference object identifier, using the intermediate voice sample synthesis model as the initial voice sample synthesis model, and returning to perform the operation of acquiring a voice content feature matching voice content of an original voice sample corresponding to the reference object identifier as a reference voice content feature until a second convergence condition is met, to obtain the target voice sample synthesis model.

3. The method according to claim 1, wherein fusing the initial voice features that belong to different training object identifiers and have corresponding voice content matching each other to obtain the target voice features comprises:

acquiring an initial voice feature corresponding to a first training object identifier as a first initial voice feature, and acquiring an initial voice feature corresponding to a second training object identifier as a second initial voice feature, voice content corresponding to the first initial voice feature and the second initial voice feature matching each other;

acquiring a first weight corresponding to the first initial voice feature and a second weight corresponding to the second initial voice feature, wherein a sum of the first weight and the second weight is 1; and performing weighted fusion on the first initial voice feature and the second initial voice feature based on the first weight and the second weight to obtain a target voice feature.

4. The method according to claim 3, wherein one or more of the first initial voice feature and the second initial voice feature comprise voice sub-features that respectively correspond to sequentially arranged voice frames of a target quantity, and performing the weighted fusion on the first initial voice feature and the second initial voice feature based on the first weight and the second weight to obtain the target voice feature comprises:

performing weighted fusion on voice sub-features corresponding to voice frames of a same sequence number based on the first weight and the second weight in the first initial voice feature and the second initial voice feature, to obtain sequentially arranged target sub-features of the target quantity, wherein voice content corresponding to the voice sub-features corresponding to the voice frames of the same sequence number matches each other; and obtaining the target voice feature based on the sequentially arranged target sub-features of the target quantity.

5. The method according to claim 1, wherein obtaining the voice feature set based on the target voice features comprises:

obtaining the voice feature set based on the initial voice features and the target voice features.

6. The method according to claim 1, wherein inputting the voice feature in the voice feature set into the initial voice conversion model to obtain the predicted voice data, and adjusting the model parameter of the initial voice conversion model based on the difference between the predicted voice data and the target voice data corresponding to the target object identifier until the first convergence condition is met, to obtain the target voice conversion model comprises:

determining a plurality of training voice feature pairs from the voice feature set, and determining a target voice feature pair from the training voice feature pairs, wherein a first training voice feature and a second training voice feature that belong to a same training voice feature pair correspond to voice content matching each other and correspond to different voice timbre;

inputting a first training voice feature in the target voice feature pair into a first initial voice conversion model to obtain first intermediate voice data and first predicted voice data, and inputting a second training voice feature in the target voice feature pair into a second initial voice conversion model to obtain second intermediate voice data, wherein the first predicted voice data is obtained based on the first intermediate voice data;

using voice data that corresponds to the target object identifier and whose voice content and voice content corresponding to the target voice feature pair match each other as the target voice data;

generating a first loss based on a difference between the first intermediate voice data and the second intermediate voice data, and generating a second loss based on a difference between the first predicted voice data and the target voice data;

adjusting a model parameter of the first initial voice conversion model and a model parameter of a second initial voice conversion model based on the first loss and the second loss to obtain a first intermediate voice conversion model and a second intermediate voice conversion model; and using the first intermediate voice conversion model as the first initial voice conversion model, using the second intermediate voice conversion model as the second initial voice conversion model, using a next training voice feature pair as the target voice feature pair, and returning to perform the operation of inputting a first training voice feature in the target voice feature pair into a first initial voice conversion model until a first convergence condition is met, to obtain a first target voice conversion model and a second target voice conversion model.

7. The method according to claim 6, wherein inputting the first training voice feature in the target voice feature pair into the first initial voice conversion model to obtain the first intermediate voice data and the first predicted voice data, and inputting the second training voice feature in the target voice feature pair into the second initial voice conversion model to obtain the second intermediate voice data comprises:

inputting the first training voice feature in the target voice feature pair into an encoder in the first initial voice conversion model to obtain the first intermediate voice data;

inputting the first intermediate voice data into a decoder in the first initial voice conversion model to obtain the first predicted voice data; and inputting the second training voice feature in the target voice feature pair into an encoder in the second initial voice conversion model to obtain the second intermediate voice data.

8. The method according to claim 6, wherein adjusting the model parameter of the first initial voice conversion model and the model parameter of the second initial voice conversion model based on the first loss and the second loss to obtain the first intermediate voice conversion model and the second intermediate voice conversion model comprises:

generating a target loss based on the first loss and the second loss;

adjusting the model parameter of the first initial voice conversion model based on the target loss to obtain the first intermediate voice conversion model; and adjusting a model parameter corresponding to the second initial voice conversion model based on a model parameter of the first intermediate voice conversion model to obtain the second intermediate voice conversion model.

9. The method according to claim 8, wherein generating the target loss based on the first loss and the second loss comprises:

acquiring a loss weight corresponding to the first loss;

adjusting the first loss based on the loss weight to obtain an updated loss; and obtaining the target loss based on the second loss and the updated loss.

10. The method according to claim 9, wherein the loss weight corresponding to the first loss increases as a quantity of rounds of model training increases.

11. The method according to claim 9, wherein when a current round number of model training is less than or equal to a preset quantity of rounds, the loss weight corresponding to the first loss remains unchanged; and when the current round number of model training is greater than the preset quantity of rounds, the loss weight corresponding to the first loss increases as a quantity of rounds of model training increases.

12. The method according to claim 8, wherein model parameters having a matching relationship exist between the first intermediate voice conversion model and the second initial voice conversion model, and adjusting the model parameter corresponding to the second initial voice conversion model based on the model parameter of the first intermediate voice conversion model to obtain the second intermediate voice conversion model comprises:

using the model parameters having a matching relationship that exist in the first intermediate voice conversion model and the second initial voice conversion model as a first model parameter and a second model parameter respectively;

fusing the first model parameter and the second model parameter having a matching relationship that exist to obtain a target model parameter; and replacing the corresponding model parameter in the second initial voice conversion model based on the target model parameter to obtain the second intermediate voice conversion model.

13. A computer device, comprising a memory and one or more processors, the memory storing computer-readable instructions that, when being executed, causes the one or more processors to perform:

acquiring a voice sample set, the voice sample set comprising a plurality of training voice samples that respectively correspond to a plurality of training object identifiers, one of the plurality of training voice samples corresponding to one of a plurality of pieces of voice content, at least one training voice sample in the voice sample set being a synthesized voice sample, the synthesized voice sample being obtained by performing voice sample synthesis on a preset voice content feature and a voice timbre feature corresponding to a training object identifier;

extracting voice features of the training voice samples to obtain initial voice features that respectively correspond to the training voice samples;

fusing initial voice features that belong to different training object identifiers and have corresponding voice content matching each other to obtain target voice features;

obtaining a voice feature set based on the target voice features; and inputting a voice feature in the voice feature set into an initial voice conversion model to obtain predicted voice data, and adjusting a model parameter of the initial voice conversion model based on a difference between the predicted voice data and target voice data corresponding to a target object identifier until a first convergence condition is met, to obtain a target voice conversion model, input data of the initial voice conversion model and voice content corresponding to the target voice data matching each other, voice timbre corresponding to output data of the target voice conversion model and voice timbre corresponding to the target object identifier matching each other.

14. The device according to claim 13, wherein the synthesized voice sample is obtained by inputting the preset voice content feature and the voice timbre feature corresponding to the training object identifier into a target voice sample synthesis model, and the one or more processors perform a training process of the target voice sample synthesis model by:

acquiring original voice samples and voice timbre features corresponding to a plurality of candidate object identifiers, and determining a reference object identifier from the plurality of candidate object identifiers;

acquiring a voice content feature matching voice content of an original voice sample corresponding to the reference object identifier as a reference voice content feature;

inputting a voice timbre feature and the reference voice content feature that correspond to the reference object identifier into an initial voice sample synthesis model to obtain a predicted voice sample corresponding to the reference object identifier;

adjusting a model parameter of the initial voice sample synthesis model based on the original voice sample and the predicted voice sample that correspond to the reference object identifier to obtain an intermediate voice sample synthesis model; and using a next candidate object identifier as the reference object identifier, using the intermediate voice sample synthesis model as the initial voice sample synthesis model, and returning to perform the operation of acquiring a voice content feature matching voice content of an original voice sample corresponding to the reference object identifier as a reference voice content feature until a second convergence condition is met, to obtain the target voice sample synthesis model.

15. The device according to claim 13, wherein the one or more processors are further configured to perform:

acquiring an initial voice feature corresponding to a first training object identifier as a first initial voice feature, and acquiring an initial voice feature corresponding to a second training object identifier as a second initial voice feature, voice content corresponding to the first initial voice feature and the second initial voice feature matching each other;

acquiring a first weight corresponding to the first initial voice feature and a second weight corresponding to the second initial voice feature, wherein a sum of the first weight and the second weight is 1; and performing weighted fusion on the first initial voice feature and the second initial voice feature based on the first weight and the second weight to obtain a target voice feature.

16. The device according to claim 15, wherein one or more of the first initial voice feature and the second initial voice feature comprise voice sub-features that respectively correspond to sequentially arranged voice frames of a target quantity, and the one or more processors are further configured to perform:

performing weighted fusion on voice sub-features corresponding to voice frames of a same sequence number based on the first weight and the second weight in the first initial voice feature and the second initial voice feature, to obtain sequentially arranged target sub-features of the target quantity, wherein voice content corresponding to the voice sub-features corresponding to the voice frames of the same sequence number matches each other; and obtaining the target voice feature based on the sequentially arranged target sub-features of the target quantity.

17. The device according to claim 13, wherein the one or more processors are further configured to perform:

obtaining the voice feature set based on the initial voice features and the target voice features.

18. The device according to claim 13, wherein the one or more processors are further configured to perform:

determining a plurality of training voice feature pairs from the voice feature set, and determining a target voice feature pair from the training voice feature pairs, wherein a first training voice feature and a second training voice feature that belong to a same training voice feature pair correspond to voice content matching each other and correspond to different voice timbre;

inputting a first training voice feature in the target voice feature pair into a first initial voice conversion model to obtain first intermediate voice data and first predicted voice data, and inputting a second training voice feature in the target voice feature pair into a second initial voice conversion model to obtain second intermediate voice data, wherein the first predicted voice data is obtained based on the first intermediate voice data;

using voice data that corresponds to the target object identifier and whose voice content and voice content corresponding to the target voice feature pair match each other as the target voice data;

generating a first loss based on a difference between the first intermediate voice data and the second intermediate voice data, and generating a second loss based on a difference between the first predicted voice data and the target voice data;

adjusting a model parameter of the first initial voice conversion model and a model parameter of a second initial voice conversion model based on the first loss and the second loss to obtain a first intermediate voice conversion model and a second intermediate voice conversion model; and using the first intermediate voice conversion model as the first initial voice conversion model, using the second intermediate voice conversion model as the second initial voice conversion model, using a next training voice feature pair as the target voice feature pair, and returning to perform the operation of inputting a first training voice feature in the target voice feature pair into a first initial voice conversion model until a first convergence condition is met, to obtain a first target voice conversion model and a second target voice conversion model.

19. The device according to claim 18, wherein the one or more processors are further configured to perform:

inputting the first training voice feature in the target voice feature pair into an encoder in the first initial voice conversion model to obtain the first intermediate voice data;

inputting the first intermediate voice data into a decoder in the first initial voice conversion model to obtain the first predicted voice data; and inputting the second training voice feature in the target voice feature pair into an encoder in the second initial voice conversion model to obtain the second intermediate voice data.

20. A non-transitory computer-readable storage medium, storing computer-readable instructions that, when being executed, causes the one or more processors to perform:

acquiring a voice sample set, the voice sample set comprising a plurality of training voice samples that respectively correspond to a plurality of training object identifiers, one of the plurality of training voice samples corresponding to one of a plurality of pieces of voice content, at least one training voice sample in the voice sample set being a synthesized voice sample, the synthesized voice sample being obtained by performing voice sample synthesis on a preset voice content feature and a voice timbre feature corresponding to a training object identifier;

extracting voice features of the training voice samples to obtain initial voice features that respectively correspond to the training voice samples;

fusing initial voice features that belong to different training object identifiers and have corresponding voice content matching each other to obtain target voice features;

obtaining a voice feature set based on the target voice features; and inputting a voice feature in the voice feature set into an initial voice conversion model to obtain predicted voice data, and adjusting a model parameter of the initial voice conversion model based on a difference between the predicted voice data and target voice data corresponding to a target object identifier until a first convergence condition is met, to obtain a target voice conversion model, input data of the initial voice conversion model and voice content corresponding to the target voice data matching each other, voice timbre corresponding to output data of the target voice conversion model and voice timbre corresponding to the target object identifier matching each other.

* * * * *